US008237760B2

(12) United States Patent
Nihei et al.

(10) Patent No.: US 8,237,760 B2
(45) Date of Patent: Aug. 7, 2012

(54) LIGHT-SOURCE DRIVING DEVICE, OPTICAL SCANNING DEVICE, AND COUNTING METHOD

(75) Inventors: Yasuhiro Nihei, Kanagawa (JP); Atsufumi Omori, Kanagawa (JP); Dan Ozasa, Kanagawa (JP); Jun Tanabe, Kanagawa (JP); Masaaki Ishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 434 days.

(21) Appl. No.: 12/541,719

(22) Filed: Aug. 14, 2009

(65) Prior Publication Data

US 2010/0045767 A1    Feb. 25, 2010

(30) Foreign Application Priority Data

Aug. 19, 2008    (JP) ................. 2008-210371
Aug. 19, 2008    (JP) ................. 2008-210376

(51) Int. Cl.
*B41J 2/435*    (2006.01)
*B41J 2/47*    (2006.01)

(52) U.S. Cl. ....................... 347/237; 347/247
(58) Field of Classification Search .................. 347/229, 347/234, 235, 237, 247–250
See application file for complete search history.

(56) References Cited

U.S. PATENT DOCUMENTS

| 6,791,596 | B2 | 9/2004 | Nihei et al. |
| 6,927,789 | B2 | 8/2005 | Ozasa et al. |
| 6,933,957 | B2 | 8/2005 | Omori et al. |
| 7,212,224 | B2 | 5/2007 | Nihei et al. |
| 7,256,815 | B2 | 8/2007 | Suzuki et al. |
| 7,271,824 | B2 | 9/2007 | Omori et al. |
| 7,283,151 | B2 | 10/2007 | Nihei et al. |
| 7,327,379 | B2 | 2/2008 | Nihei et al. |
| 7,456,856 | B2 | 11/2008 | Nihei |
| 7,463,278 | B2 | 12/2008 | Ozasa et al. |
| 7,515,170 | B2 | 4/2009 | Omori et al. |
| 7,656,422 | B2 * | 2/2010 | Ozasa et al. ............ 347/250 |
| 2005/0089069 | A1 | 4/2005 | Ozasa et al. |
| 2005/0219354 | A1 | 10/2005 | Omori et al. |
| 2006/0285186 | A1 | 12/2006 | Ishida et al. |
| 2007/0030548 | A1 | 2/2007 | Nihei et al. |
| 2007/0126517 | A1 | 6/2007 | Ozasa |
| 2007/0132828 | A1 | 6/2007 | Ishida et al. |
| 2007/0206234 | A1 | 9/2007 | Ozasa et al. |
| 2008/0088893 | A1 | 4/2008 | Ishida et al. |
| 2008/0123160 | A1 | 5/2008 | Omori et al. |

(Continued)

FOREIGN PATENT DOCUMENTS

JP    2003-276234    9/2003

*Primary Examiner* — Hai C Pham
(74) *Attorney, Agent, or Firm* — Cooper & Dunham LLP

(57) ABSTRACT

A light-source driving device includes a high-frequency clock generating circuit that generates high-frequency clock signals of which phases are different from each other; an image-data generating circuit that generates a plurality of pieces of image data corresponding to light emitting units in accordance with image information; a write control circuit that generates a plurality of pieces of modulation data corresponding to the light emitting units based on the image data and adjusts output timing of the modulation data individually in units of time corresponding to a phase difference of the high-frequency clock signals; and a light-source driving circuit that drives the light emitting units based on a plurality of pieces of PWM data output from the write control circuit.

15 Claims, 31 Drawing Sheets

U.S. PATENT DOCUMENTS

| | | |
|---|---|---|
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0267663 A1 | 10/2008 | Ichii et al. |
| 2008/0284838 A1 | 11/2008 | Suzuki et al. |
| 2008/0291259 A1 | 11/2008 | Nihei et al. |
| 2008/0298842 A1 | 12/2008 | Ishsida et al. |
| 2009/0074437 A1 | 3/2009 | Tanabe et al. |
| 2009/0091805 A1 | 4/2009 | Tanabe et al. |
| 2009/0167837 A1 | 7/2009 | Ishida et al. |
| 2009/0174915 A1 | 7/2009 | Nihei et al. |
| 2009/0195635 A1 | 8/2009 | Ishida et al. |

* cited by examiner

FIG. 19

| IMAGE DATA | MODULATION DATA BIT 15 ············ BIT 0 |
|---|---|
| 0000 | 0000000000000000 |
| 0001 | 0000000000000001 |
| 0010 | 0000000000000011 |
| 0011 | 0000000000000111 |
| 0100 | 0000000000001111 |
| 0101 | 0000000000011111 |
| 0110 | 0000000000111111 |
| 0111 | 0000000001111111 |
| 1000 | 0000000011111111 |
| 1001 | 0000000111111111 |
| 1010 | 0000001111111111 |
| 1011 | 0000011111111111 |
| 1100 | 0000111111111111 |
| 1101 | 0001111111111111 |
| 1110 | 0011111111111111 |
| 1111 | 0111111111111111 |

FIG. 20

| CORRECTION DATA BIT 3 TO BIT 0 | MODULATION DATA [15:0] |
|---|---|
| 0000 | {MODULATION DATA [15:0]} |
| 0001 | {{MODULATION DATA A [14:0]}, {MODULATION DATA B [15]}} |
| 0010 | {{MODULATION DATA A [13:0]}, {MODULATION DATA B [15:14]}} |
| 0011 | {{MODULATION DATA A [12:0]}, {MODULATION DATA B [15:13]}} |
| 0100 | {{MODULATION DATA A [11:0]}, {MODULATION DATA B [15:12]}} |
| 0101 | {{MODULATION DATA A [10:0]}, {MODULATION DATA B [15:11]}} |
| 0110 | {{MODULATION DATA A [9:0]}, {MODULATION DATA B [15:10]}} |
| 0111 | {{MODULATION DATA A [8:0]}, {MODULATION DATA B [15:9]}} |
| 1000 | {{MODULATION DATA A [7:0]}, {MODULATION DATA B [15:8]}} |
| 1001 | {{MODULATION DATA A [6:0]}, {MODULATION DATA B [15:7]}} |
| 1010 | {{MODULATION DATA A [5:0]}, {MODULATION DATA B [15:6]}} |
| 1011 | {{MODULATION DATA A [4:0]}, {MODULATION DATA B [15:5]}} |
| 1100 | {{MODULATION DATA A [3:0]}, {MODULATION DATA B [15:4]}} |
| 1101 | {{MODULATION DATA A [2:0]}, {MODULATION DATA B [15:3]}} |
| 1110 | {{MODULATION DATA A [1:0]}, {MODULATION DATA B [15:2]}} |
| 1111 | {{MODULATION DATA A [0]}, {MODULATION DATA B [15:1]}} |

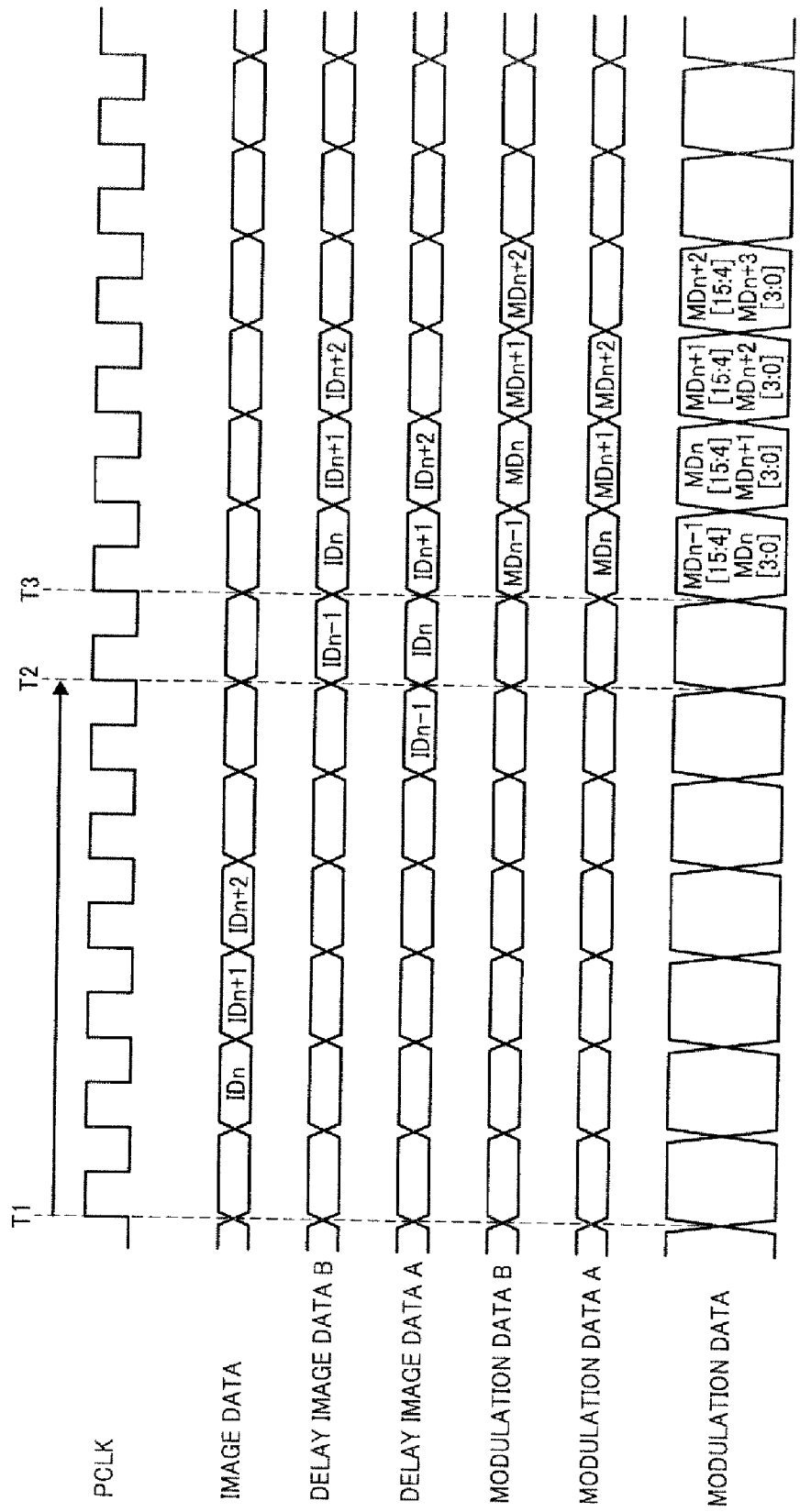

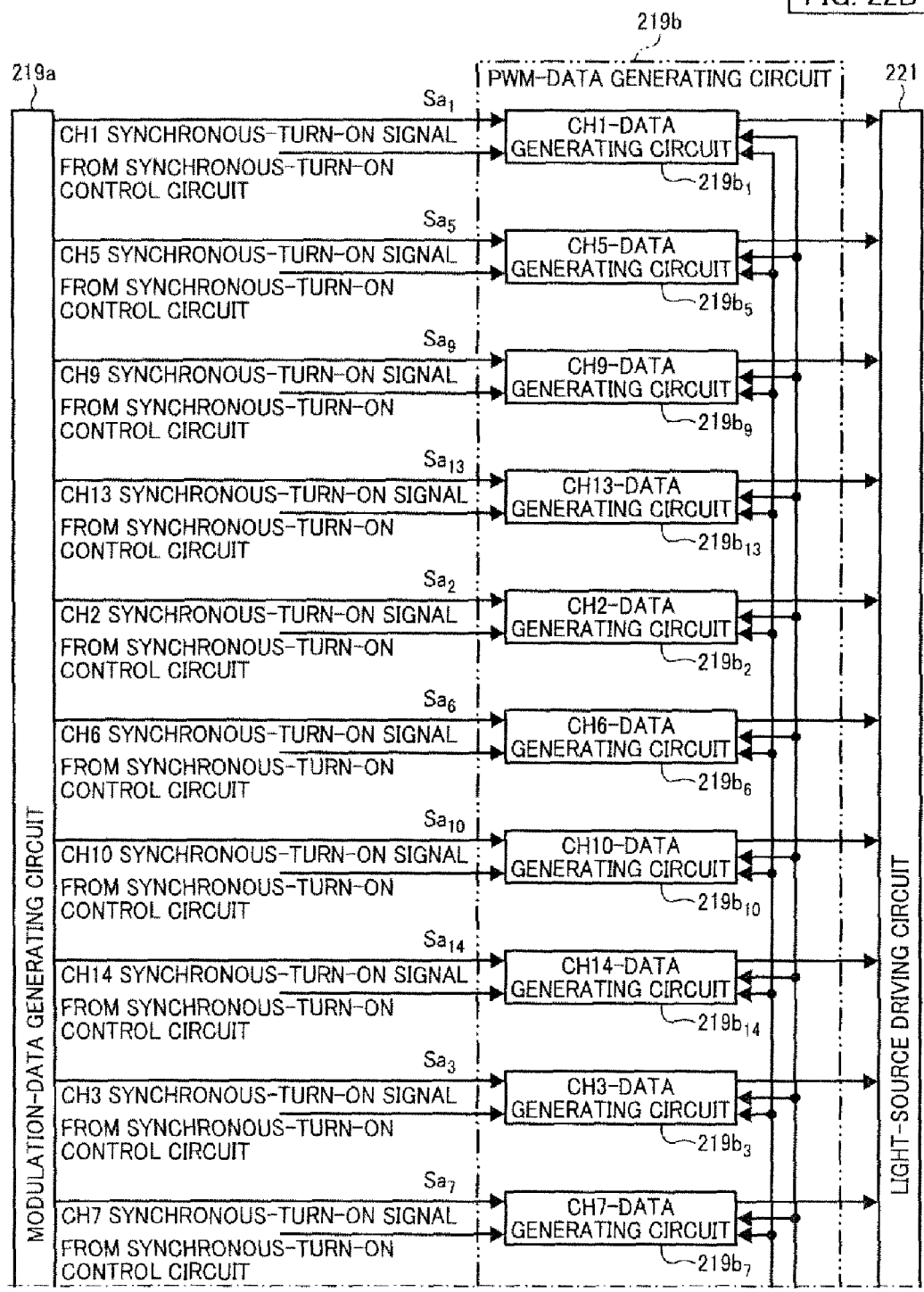

FIG. 25

| LIGHT EMITTING UNIT ROW | DISTANCE FROM FIRST-ROW LIGHT EMITTING UNITS IN M DIRECTION [μm] | POSITION OF LIGHT SPOT ON SCAN TARGET SURFACE FROM FIRST-ROW SPOTS IN MAIN SCANNING DIRECTION [μm] | | | POSITION OF LIGHT SPOT ON SCAN TARGET SURFACE FROM FIRST-ROW SPOTS IN MAIN SCANNING DIRECTION ※ (NUMBER OF PIXELS) | | |
|---|---|---|---|---|---|---|---|
| | | MAGNIFICATION=4 | MAGNIFICATION=5 | MAGNIFICATION=6 | MAGNIFICATION=4 | MAGNIFICATION=5 | MAGNIFICATION=6 |
| SECOND ROW | 30 | 120 | 150 | 180 | 5.7 | 7.1 | 8.6 |
| THIRD ROW | 60 | 240 | 300 | 360 | 11.4 | 14.3 | 17.1 |
| FOURTH ROW | 90 | 360 | 450 | 540 | 17.1 | 21.4 | 25.7 |

※ NUMBER OF PIXELS IN 1200 dpi (21 μm/dot)

FIG. 26

| LIGHT EMITTING UNIT ROW | REQUIRED NUMBER OF STAGES OF SHIFT REGISTER | TARGET STAGE OF SHIFT REGISTER WHOSE OUTPUT SIGNAL IS TO BE SELECTED |
|---|---|---|
| SECOND ROW | 9 | 5-TH STAGE TO 9-TH STAGE |
| THIRD ROW | 18 | 11-TH STAGE TO 18-TH STAGE |
| FOURTH ROW | 26 | 17-TH STAGE TO 26-TH STAGE |

FIG. 30

| IMAGE DATA | MODULATION DATA BIT 31 ·················· BIT 0 |
|---|---|
| 0000 | 00000000000000000000000000000000 |
| 0001 | 00000000000000000000000000000011 |
| 0010 | 00000000000000000000000000001111 |
| 0011 | 00000000000000000000000000111111 |
| 0100 | 00000000000000000000000011111111 |
| 0101 | 00000000000000000000001111111111 |
| 0110 | 00000000000000000000111111111111 |
| 0111 | 00000000000000000011111111111111 |
| 1000 | 00000000000000001111111111111111 |
| 1001 | 00000000000000111111111111111111 |
| 1010 | 00000000000011111111111111111111 |
| 1011 | 00000000001111111111111111111111 |
| 1100 | 00000000111111111111111111111111 |
| 1101 | 00000011111111111111111111111111 |
| 1110 | 00001111111111111111111111111111 |
| 1111 | 00111111111111111111111111111111 |

FIG. 31

| CORRECTION DATA BIT 4 TO BIT 0 | MODULATION DATA [31:0] |
|---|---|
| 00000 | {MODULATION DATA A [31:0]} |
| 00001 | {{MODULATION DATA A [30:0]}, {MODULATION DATA B [31]}} |
| 00010 | {{MODULATION DATA A [29:0]}, {MODULATION DATA B [31:30]}} |
| 00011 | {{MODULATION DATA A [28:0]}, {MODULATION DATA B [31:29]}} |
| 00100 | {{MODULATION DATA A [27:0]}, {MODULATION DATA B [31:28]}} |
| 00101 | {{MODULATION DATA A [26:0]}, {MODULATION DATA B [31:27]}} |
| 00110 | {{MODULATION DATA A [25:0]}, {MODULATION DATA B [31:26]}} |
| 00111 | {{MODULATION DATA A [24:0]}, {MODULATION DATA B [31:25]}} |
| 01000 | {{MODULATION DATA A [23:0]}, {MODULATION DATA B [31:24]}} |
| 01001 | {{MODULATION DATA A [22:0]}, {MODULATION DATA B [31:23]}} |
| 01010 | {{MODULATION DATA A [21:0]}, {MODULATION DATA B [31:22]}} |
| 01011 | {{MODULATION DATA A [20:0]}, {MODULATION DATA B [31:21]}} |
| 01100 | {{MODULATION DATA A [19:0]}, {MODULATION DATA B [31:20]}} |
| 01101 | {{MODULATION DATA A [18:0]}, {MODULATION DATA B [31:19]}} |
| 01110 | {{MODULATION DATA A [17:0]}, {MODULATION DATA B [31:18]}} |
| 01111 | {{MODULATION DATA A [16:0]}, {MODULATION DATA B [31:17]}} |
| 10000 | {{MODULATION DATA A [15:0]}, {MODULATION DATA B [31:16]}} |
| 10001 | {{MODULATION DATA A [14:0]}, {MODULATION DATA B [31:15]}} |
| 10010 | {{MODULATION DATA A [13:0]}, {MODULATION DATA B [31:14]}} |
| 10011 | {{MODULATION DATA A [12:0]}, {MODULATION DATA B [31:13]}} |
| 10100 | {{MODULATION DATA A [11:0]}, {MODULATION DATA B [31:12]}} |
| 10101 | {{MODULATION DATA A [10:0]}, {MODULATION DATA B [31:11]}} |
| 10110 | {{MODULATION DATA A [9:0]}, {MODULATION DATA B [31:10]}} |
| 10111 | {{MODULATION DATA A [8:0]}, {MODULATION DATA B [31:9]}} |
| 11000 | {{MODULATION DATA A [7:0]}, {MODULATION DATA B [31:8]}} |
| 11001 | {{MODULATION DATA A [6:0]}, {MODULATION DATA B [31:7]}} |
| 11010 | {{MODULATION DATA A [5:0]}, {MODULATION DATA B [31:6]}} |
| 11011 | {{MODULATION DATA A [4:0]}, {MODULATION DATA B [31:5]}} |
| 11100 | {{MODULATION DATA A [3:0]}, {MODULATION DATA B [31:4]}} |
| 11101 | {{MODULATION DATA A [2:0]}, {MODULATION DATA B [31:3]}} |
| 11110 | {{MODULATION DATA A [1:0]}, {MODULATION DATA B [31:2]}} |
| 11111 | {{MODULATION DATA A [0]}, {MODULATION DATA B [31:1]}} |

LIGHT-SOURCE DRIVING DEVICE, OPTICAL SCANNING DEVICE, AND COUNTING METHOD

CROSS-REFERENCE TO RELATED APPLICATIONS

The present application claims priority to and incorporates by reference the entire contents of Japanese Patent Application No. 2008-210371 filed in Japan on Aug. 19, 2008 and Japanese Patent Application No. 2008-210376 filed in Japan on Aug. 19, 2008.

BACKGROUND OF THE INVENTION

1. Field of the Invention

The present invention relates to technology for controlling timing of turning on a plurality of light emitting units in an optical scanning device for use in an image forming apparatus.

2. Description of the Related Art

In a field of an image forming apparatus such as a laser printer and a digital copier, a demand is growing for improving an image forming speed (high speed) and writing density (high image quality). To meet the demand, one known approach is to scan a scan target surface with a plurality of light beams by using a multibeam light source capable of emitting a plurality of light beams simultaneously.

The multibeam light source includes an array of light emitting units such that a certain light emitting unit is displaced from an adjacent light emitting unit in a direction corresponding to a main-scanning direction. When the light source is configured in this manner, it is possible to narrow an interval between adjacent scanning lines. In this arrangement, however, timing of turning on each light emitting unit needs to be controlled to align writing start positions on a plurality of scanning lines.

For example, Japanese Patent Application Laid-open No. 2003-276234 discloses an image forming apparatus that includes a control unit that performs of/off control of the light emitting units. The control unit determines timing of turning on at least one light emitting unit of a light source based on an image clock generated in synchronization with a signal detected by a synchronization detecting unit, and also timing of turning on other light emitting units by changing a count value of the image clock, thereby controlling turn-on of the light emitting units.

In a typical image forming apparatus, optical characteristics of optical components or a positional relationship between optical components may change due to temperature change, temporal change, or the like after shipping. Such a change in the optical characteristics causes displacement of a light spot position from a desired position on a scan target surface. This, for example, results in displacement of a writing position of image data in a main-scanning direction. In the image forming apparatus disclosed in Japanese Patent Application Laid-open No. 2003-276234, it is difficult to correct the displacement of the writing position with high accuracy in real time.

SUMMARY OF THE INVENTION

It is an object of the present invention to at least partially solve the problems in the conventional technology.

According to an aspect of the present invention there is provided a light-source driving device for use in an optical scanning device to drive a light source, the light source including a plurality of light emitting units arranged in different positions with each other at least in a scanning-line direction, each of the light emitting unit configured to emit a light beam, the light beams emitted from the light emitting unit being directed by an optical system to a scan target surface to scan the scan target surface in a main-scanning direction along a plurality of scanning lines to write image information on the scan target surface. The light-source driving device includes a high-frequency clock generating circuit configured to generate a plurality of high-frequency clock signals with differing phases; a write-data generating circuit that generates a plurality of pieces of write data corresponding to the light emitting units in accordance with the image information; a modulation-data control circuit that generates a plurality of pieces of modulation data corresponding to the light emitting units based on the write data and adjusts output timing of the modulation data individually in units of time corresponding to a phase difference of the high-frequency clock signals; and a driving circuit that drives the light emitting units based on the modulation data output from the modulation-data control circuit.

According to another aspect of the present invention there is provided an optical scanning device that scans a scan target surface in a main-scanning direction along a plurality of scanning lines with a plurality of light beams. The optical scanning device includes a light source that includes a plurality of light emitting units arranged in different positions with each other at least in a scanning-line direction; the above light-source driving device; and an optical system that focuses the light beams from the light source on the scan target surface as a plurality of light spots and provides a control to move the light spots in the main-scanning direction along the scanning lines.

According to still another aspect of the present invention there is provided a counting method for counting a deviation of a timing of starting writing on a plurality of scanning lines in an optical scanning device that scans a scan target surface along the scanning lines with a plurality of light beams from a plurality of light emitting units arranged in different positions at least in a scanning-line direction to write image information on the scan target surface. The counting method includes obtaining a time difference between a first time at which a first light receiving element outputs a synchronization detection signal before starting writing receives light emitted from a first light emitting unit and a second time at which a second light receiving element outputs a synchronization detection signal after the writing receives the light, from among the light emitting units, as a first time; obtaining a time difference between a third time at which the first light receiving element receives light emitted from the first light emitting unit and a fourth time at which the second light receiving element receives light emitted from the second light emitting unit, as a second time; and obtaining a deviation of the second light emitting unit with respect to the first light emitting unit based on a difference between the first time and the second time.

According to still another aspect of the present invention there is provided an optical scanning device that scans a scan target surface in a main-scanning direction along a plurality of scanning lines with a plurality of light beams. The optical scanning device includes a light source that includes a plurality of light emitting units arranged in different positions with each other at least in a scanning-line direction; an optical system that focuses the light beams from the light source on the scan target surface as a plurality of light spots and provides a control to move the light spots in the main-scanning direction along the scanning lines; a first light receiving unit that receives light before starting writing; a second light receiving element that receives light after the writing; and a control unit that obtains the deviation of a second light emitting unit with respect to a first light emitting unit from among the light emitting units, based on a difference between a first time and a second time, the first time being a time difference between a first time at which the first light receiving element receives light emitted from the first light emitting unit and a second time at which the second light receiving element receives the light, and the second time being a time difference between a third time at which the first light receiving element receives light emitted from the first light emitting unit and a fourth time at which the second light receiving element receives light emitted from the second light emitting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a table for explaining a relationship between image data and modulation data;

FIG. 20 is a table for explaining a relationship between lowest 4 bits of correction data and modulation data output from a modulation-data selecting circuit shown in FIG. 18;

FIG. 21 is a timing chart for explaining an operation of the data generating/correcting circuit;

FIG. 25 is a table for explaining a modified example of a delay circuit shown in FIG. 18;

FIG. 26 is another table for explaining the modified example of the delay circuit;

FIG. 30 is a table for explaining a relationship between image data and modulation data corresponding to FIG. 28;

FIG. 31 is a table for explaining a relationship between lowest 5 bits of correction data and modulation data output from a modulation-data selecting circuit corresponding to FIG. 28;

DETAILED DESCRIPTION OF THE PREFERRED EMBODIMENTS

Exemplary embodiments of the present invention are explained in detail below with reference to the accompanying drawings.

Figure 1:
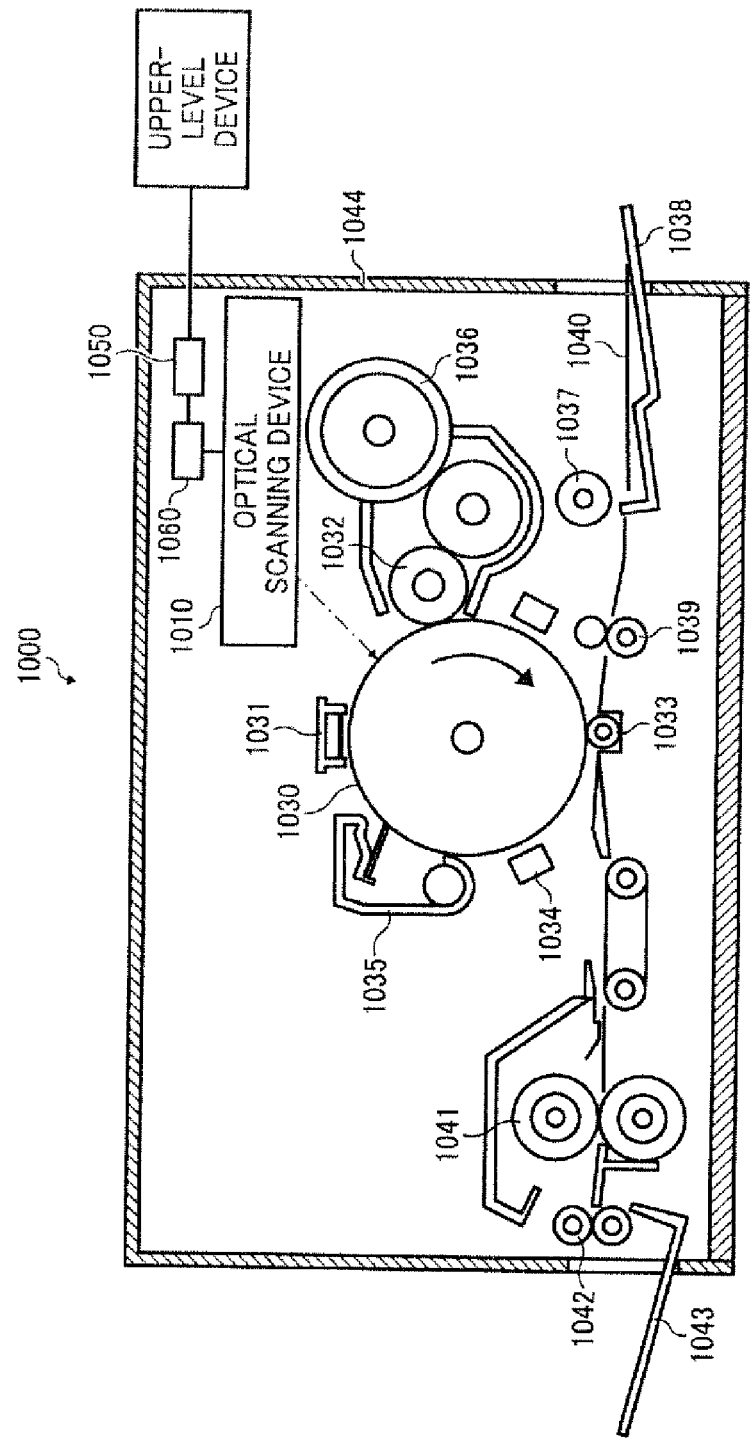
FIG. 1 is a schematic diagram illustrating a configuration of a laser printer according to a an embodiment of the present invention.

FIG. 1 is a schematic diagram illustrating a configuration of a laser printer 1000 as an image forming apparatus according to an embodiment of the present invention. The laser printer 1000 includes an optical scanning device 1010, a photosensitive drum 1030, a charging unit 1031, a developing roller 1032, a transfer charging unit 1033, a neutralizing unit 1034, a cleaning unit 1035, a toner cartridge 1036, a feeding roller 1037, a feed tray 1038, a pair of registration rollers 1039, a pair of fixing rollers 1041, a pair of discharging rollers 1042, a discharge tray 1043, a communication control device 1050, and a printer control device 1060 that collectively controls the above units. The above units are accommodated at predetermined positions in a printer housing 1044.

The communication control device 1050 controls a bilateral communication of the laser printer 1000 with an upper-level device, such as a personal computer (PC), via a network or the like.

The photosensitive drum 1030 is a cylindrical body with a photosensitive layer on its surface that functions as a scan target surface. The photosensitive drum 1030 rotates in a direction indicated by an arrow in FIG. 1.

The charging unit 1031, the developing roller 1032, the transfer charging unit 1033, the neutralizing unit 1034, and the cleaning unit 1035 are arranged around the photosensitive drum 1030 in this order along a direction in which the photosensitive drum 1030 rotates.

The charging unit 1031 uniformly charges the surface of the photosensitive drum 1030.

The optical scanning device 1010 irradiates the surface of the photosensitive drum 1030 charged by the charging unit 1031 with a light beam that is modulated based on image information received from the upper-level device. As a result, a latent image is formed on the surface of the photosensitive drum 1030. The latent image moves along with the rotation of the photosensitive drum 1030 in a direction toward the developing roller 1032.

Toner is accommodated in the toner cartridge 1036 and is supplied to the developing roller 1032.

The toner carried by the developing roller 1032 on its surface adheres to the latent image on the surface of the photosensitive drum 1030. As a result, the latent image is developed into a toner image. The toner image moves in a direction toward the transfer charging unit 1033 along with the rotation of the photosensitive drum 1030.

Recording sheets 1040 are accommodated in the feed tray 1038. The feeding roller 1037, which is arranged near the feed tray 1038, picks up the recording sheets 1040 one by one from the feed tray 1038 and conveys the picked-up sheet in a nip between the registration rollers 1039. The registration rollers 1039 once hold the recording sheet 1040 and then conveys it toward a nip between the photosensitive drum 1030 and the transfer charging unit 1033 in synchronization with the rotation of the photosensitive drum 1030.

The transfer charging unit 1033 is applied with a voltage having a polarity opposite to that of the toner. As a result, the toner on the surface of the photosensitive drum 1030 is electrically attracted toward the recording sheet 1040. In other words, the toner image on the surface of the photosensitive drum 1030 is transferred onto the recording sheet 1040. The recording sheet 1040 with the toner image transferred thereon is conveyed to a nip between the fixing rollers 1041.

The fixing rollers 1041 apply heat and pressure to the recording sheet 1040. As a result, the toner image is fixed to the recording sheet 1040. Then, the recording sheet 1040 with the toner image fixed thereto is conveyed to the discharge tray 1043 by the discharging rollers 1042 to be stacked thereon in order.

The neutralizing unit 1034 neutralizes the surface of the photosensitive drum 1030.

The cleaning unit 1035 removes toner (residual toner) remaining on the surface of the photosensitive drum 1030. The surface of the photosensitive drum 1030 from which the residual toner is removed returns to a position opposing the charging unit 1031 for next image formation process.

Figure 2:
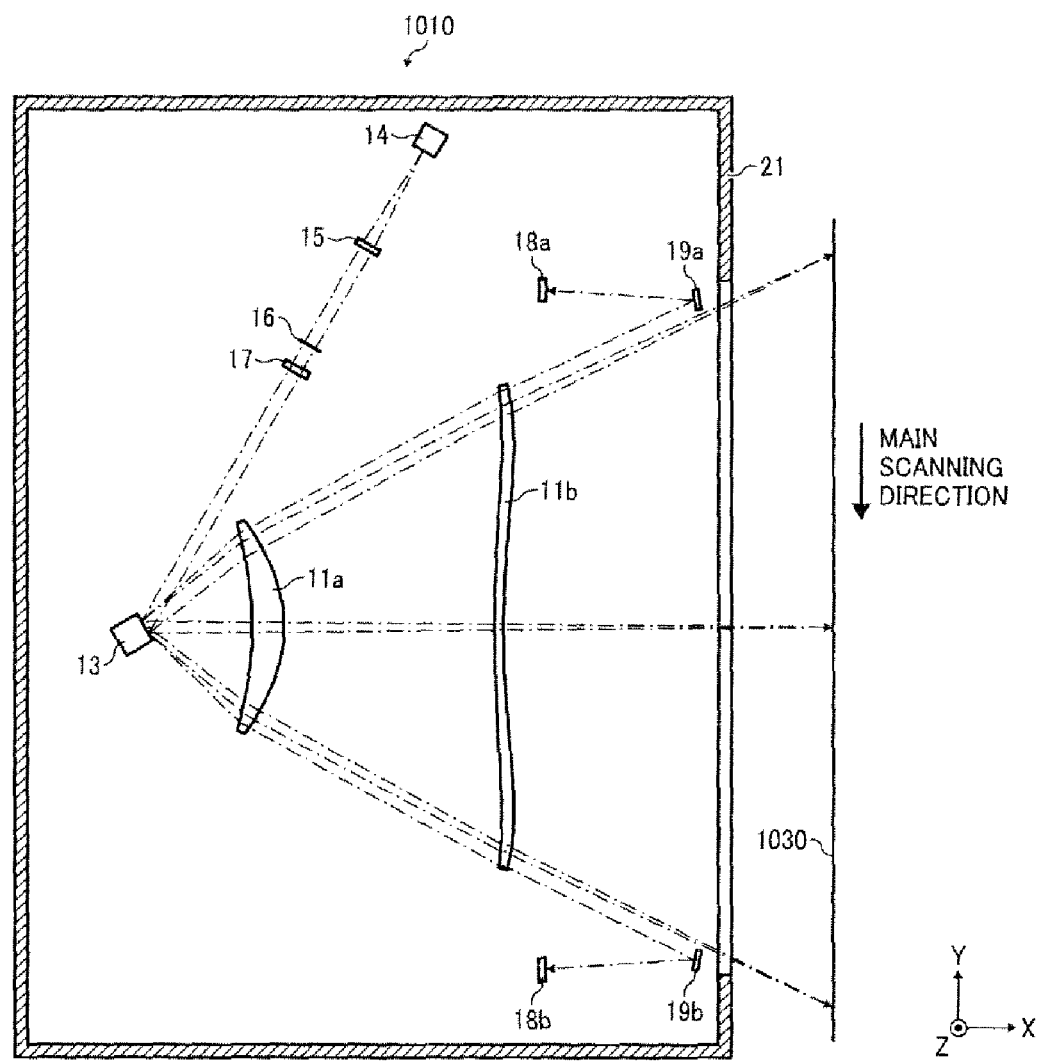
FIG. 2 is a schematic diagram of an optical scanning device shown in FIG. 1.

The configuration of the optical scanning device 1010 is explained below. As shown in FIG. 2, the optical scanning device 1010 includes a light source 14, a coupling lens 15, an aperture plate 16, a cylindrical lens 17, a polygon mirror 13, an fθ lens 11a, a toroidal lens 11b, light sensors 18a and 18b, mirrors 19a and 19b, and a scan control device 22 (see FIG. 5). The above units are arranged at predetermined positions in a housing 21.

In the specification, in an XYZ three-dimensional Cartesian coordinate system, a Y-axis direction is a direction along a longitudinal direction of the photosensitive drum 1030, and an X-axis direction is a direction along an optical axis of the fθ lens 11a and the toroidal lens 11b. Moreover, in the following explanation, a direction corresponding to the main-scanning direction is indicated as a main-scanning corresponding direction, and a direction corresponding to the sub-scanning direction is indicated as a sub-scanning corresponding direction, for convenience.

Figure 3:
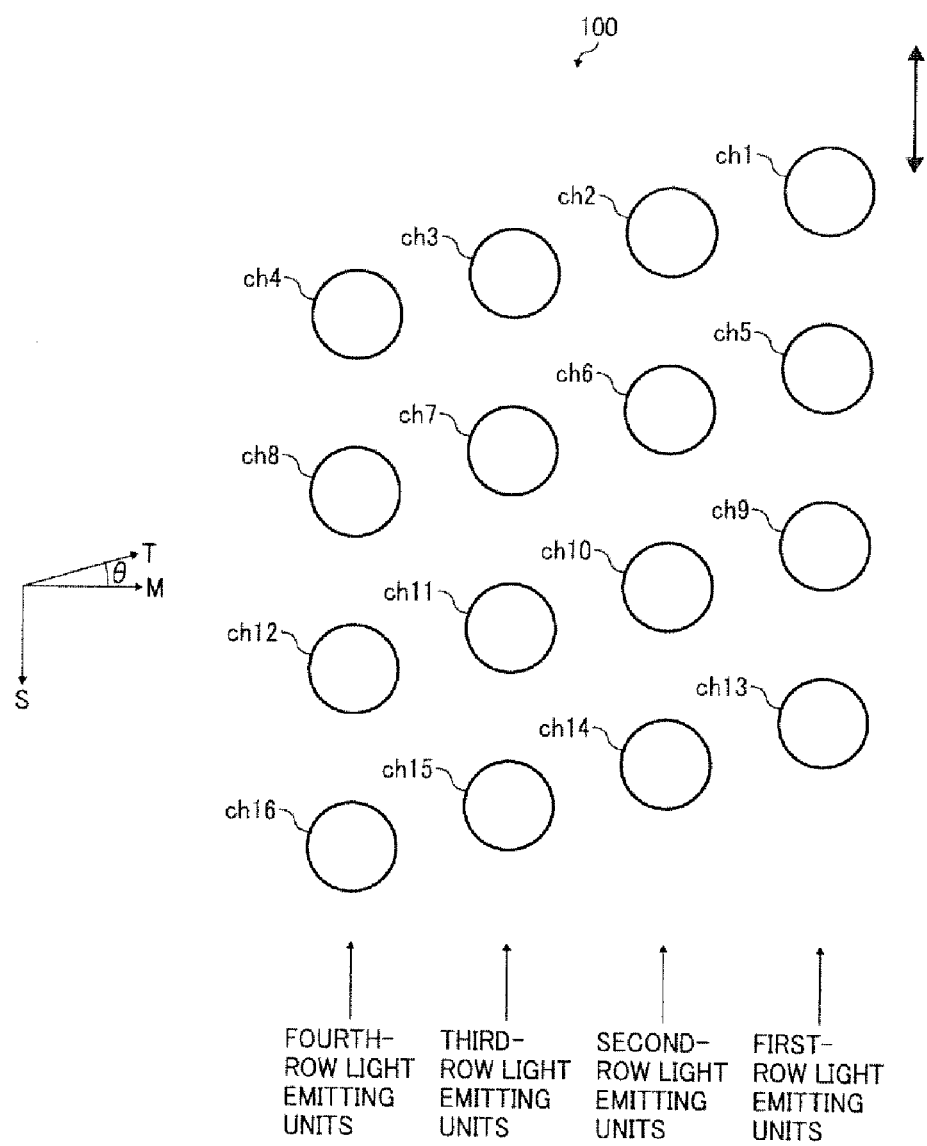
FIG. 3 is a schematic diagram for explaining a vertical cavity surface emitting laser (VCSEL) array in a light source shown in FIG. 2.

As shown in FIG. 3, as an example, the light source 14 includes a two-dimensional array 100 that is formed by two-dimensionally arranging 16 light emitting units ch1 to ch16 on one substrate. In FIG. 3, an M direction corresponds to the main-scanning corresponding direction and an S direction corresponds to the sub-scanning corresponding direction.

The light emitting units ch1, ch5, ch9, and ch13 are denoted also as first-row light emitting units, the light emitting units ch2, ch6, ch10, and ch14 are denoted also as second-row light emitting units, the light emitting units ch3, ch7, ch11, and ch15 are denoted also as third-row light emitting units, and the light emitting units ch4, ch8, ch12, and ch16 are denoted also as fourth-row light emitting units. The four rows are arranged at equal intervals of, for example 30 micrometers (μm), in the M direction.

Furthermore, in the two-dimensional array 100, when all of the light emitting units ch1 to ch16 are orthographically projected on a virtual line extending in the S direction, an interval between adjacent light emitting units is the same. In the specification, the term "a light-emitting-unit interval" denotes an interval between the centers of two adjacent light emitting units. Therefore, the surface of the photosensitive drum 1030 can be scanned simultaneously with 16 light beams.

Each of the light emitting units ch1 to ch16 is a vertical cavity surface emitting laser (VCSEL) of which oscillation wavelength is 780 nanometer (nm) band. In other words, the two-dimensional array 100 is a so-called VCSEL array.

Returning to FIG. 2, the coupling lens 15 collimates a light beam emitted from the light source 14 into an approximately parallel light beam.

An aperture is formed in the aperture plate 16, which defines a diameter of the light beam reached thereto via the coupling lens 15.

The cylindrical lens 17 focuses the light beam that has passed through the aperture of the aperture plate 16 near a deflection/reflection surface of the polygon mirror 13 with respect to the Z-axis direction.

An optical system arranged on the optical path between the light source 14 and the polygon mirror 13 is also called a prior-deflector optical system. In the present embodiment, the prior-deflector optical system includes the coupling lens 15, the aperture plate 16, and the cylindrical lens 17.

The polygon mirror 13 has four mirror surfaces each of which functions as the deflection/reflection surface. The polygon mirror 13 rotates at a constant angular rate around an axis parallel to the Z-axis direction to deflect the light beam from the cylindrical lens 17.

The fθ lens 11a is arranged on an optical path of a light beam deflected by the polygon mirror 13.

The toroidal lens 11b is arranged on an optical path of a light beam that has passed through the fθ lens 11a. The light beam that has passed through the toroidal lens 11b is irradiated to the surface of the photosensitive drum 1030 to form a light spot. The light spot moves in the longitudinal direction of the photosensitive drum 1030 along with the rotation of the polygon mirror 13. In other words, the light spot scans the surface of the photosensitive drum 1030. At this time, the moving direction of the light spot corresponds to the main-scanning direction, and the rotation direction of the photosensitive drum 1030 corresponds to the sub-scanning direction.

An optical system arranged between the polygon mirror 13 and the photosensitive drum 1030 is also called a scanning optical system. In the present embodiment, the scanning optical system includes the fθ lens 11a and the toroidal lens 11b. At least one reflecting mirror can be arranged on at least one of optical paths between the fθ lens 11a and the toroidal lens 11b and between the toroidal lens 11b and the photosensitive drum 1030.

Figure 4:
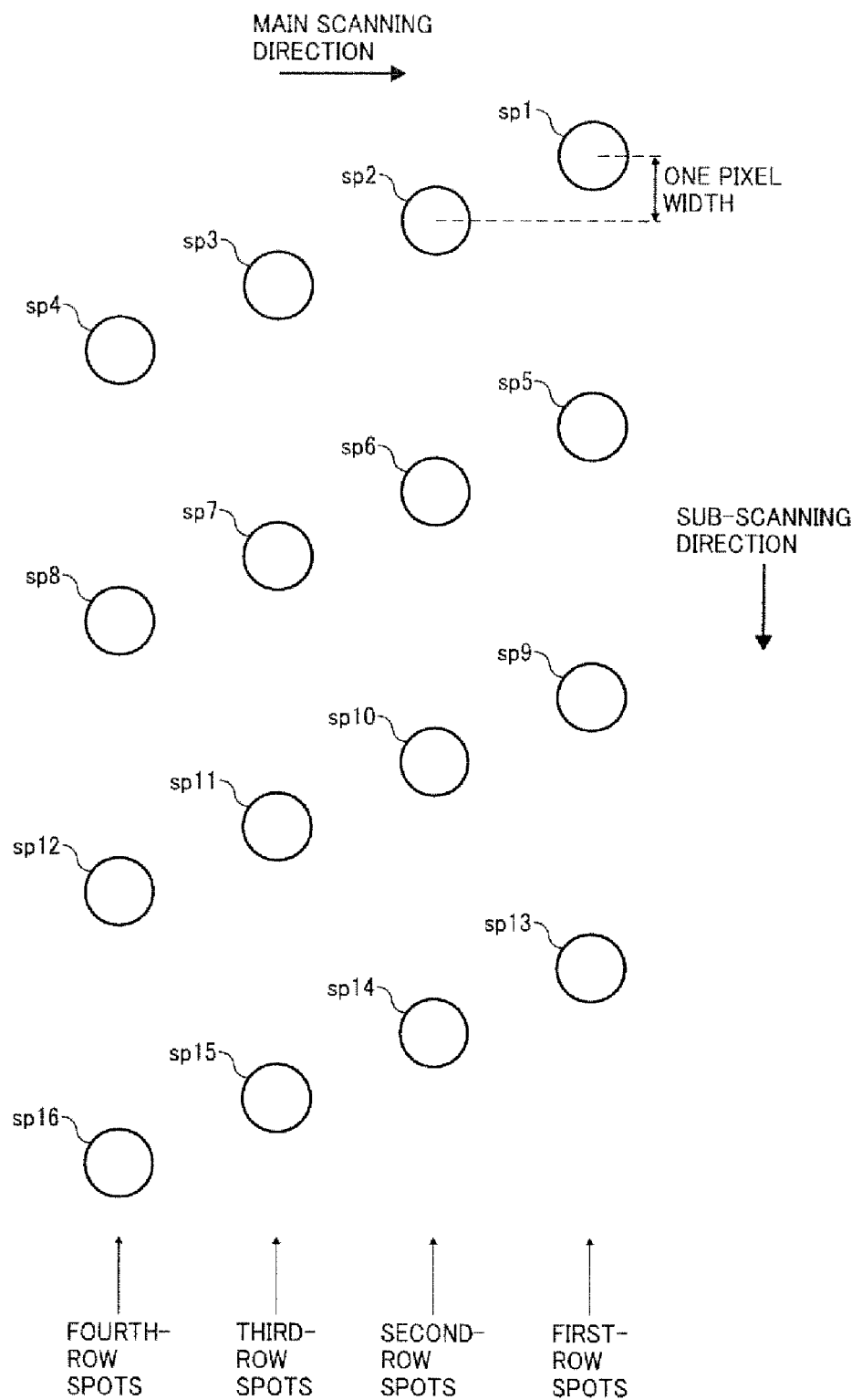
FIG. 4 is a schematic diagram for explaining light spots formed on a surface of a photosensitive drum shown in FIG. 1 by the VCSEL array shown in FIG. 3.

In the present embodiment, when the light emitting units ch1 to ch16 are turned on simultaneously, as shown in FIG. 4, a light spot sp1 by the light beam from the light emitting unit ch1, a light spot sp2 by the light beam from the light emitting unit ch2, a light spot sp3 by the light beam from the light emitting unit ch3, . . . , and a light spot sp16 by the light beam from the light emitting unit ch16 are formed on the surface of the photosensitive drum 1030.

The light spots sp1, sp5, sp9, and sp13 are denoted also as first-row spots, the light spots sp2, sp6, sp10, and sp14 are denoted also as second-row spots, the light spots sp3, sp7, sp11, and sp15 are denoted also as third-row spots, and the light spots sp4, sp8, sp12, and sp16 are denoted also as fourth-row spots.

Returning to FIG. 2, part of light beams in one scanning before writing enters the light sensor 18a via the mirror 19a from among light beams that are deflected by the polygon mirror 13 and pass the scanning optical system. The light sensor 18a generates a signal (hereinafter, "front-end synchronization detection signal") that is in a high level when light intensity of the received light is equal to or lower than a predetermined level and changes to a low level when light intensity of the received light exceeds the predetermined level, and outputs the signal to the scan control device 22.

Part of light beams in one scanning after writing enters the light sensor 18b via the mirror 19b from among the light beams that are deflected by the polygon mirror 13 and pass the scanning optical system. The light sensor 18b generates a signal (hereinafter, "rear-end synchronization detection signal") that is in the high level when light intensity of the received light is equal to or lower than the predetermined level and changes to the low level when light intensity of the received light exceeds the predetermined level, and outputs the signal to the scan control device 22.

Figure 5:
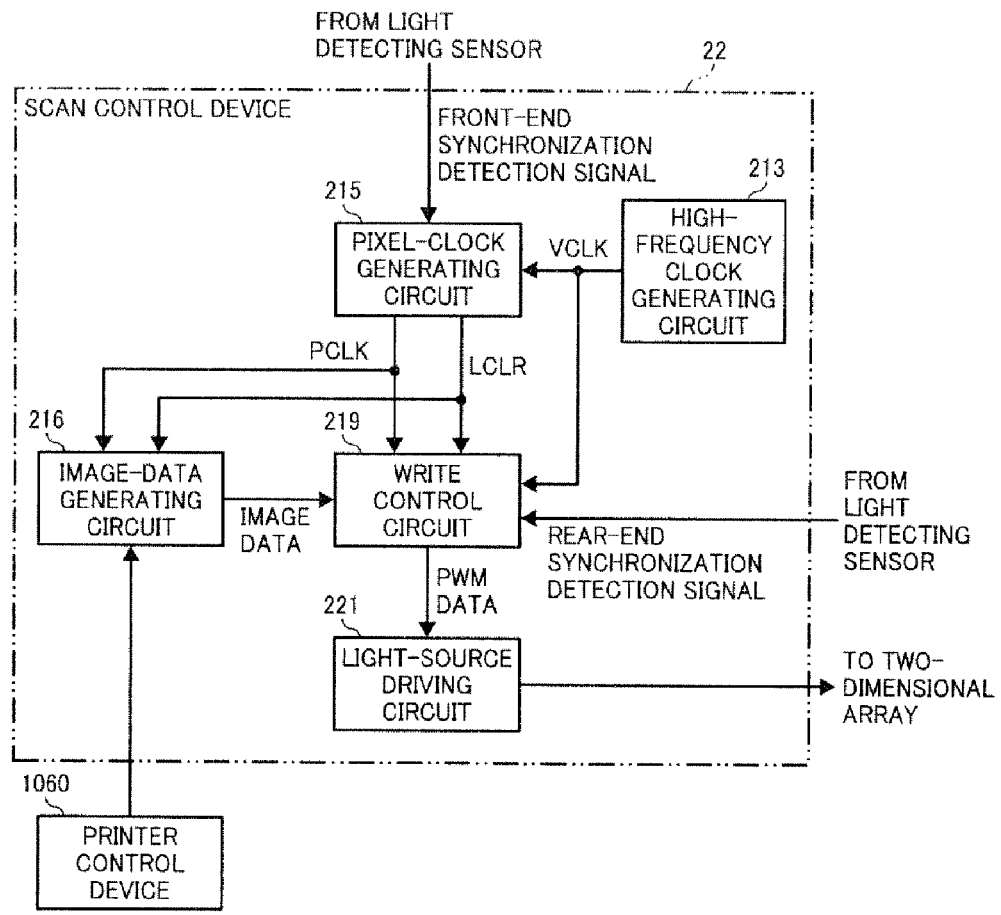
FIG. 5 is a block diagram illustrating a configuration of a scan control device.

As shown in FIG. 5, as an example, the scan control device 22 includes a high-frequency clock generating circuit 213, a pixel-clock generating circuit 215, an image-data generating circuit 216, a write control circuit 219, and a light-source driving circuit 221. Arrows in FIG. 5 indicate flows of representative signals and information and thus do not indicate all connection relations between the blocks.

Figure 6:
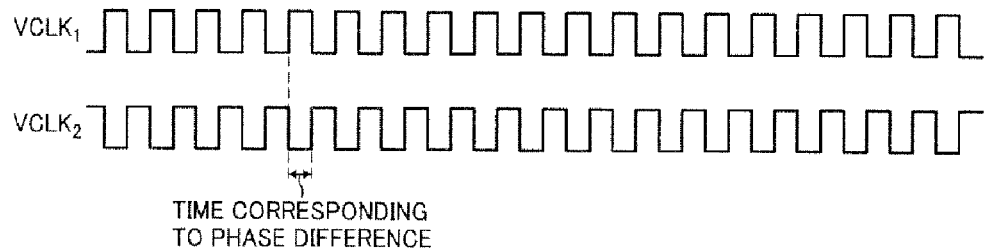
FIG. 6 is a waveform for explaining two high-frequency clock signals with differing phases.

The high-frequency clock generating circuit 213 generates a plurality of high-frequency clock signals of which phases are different from each other. As shown in FIG. 6, as an example, the high-frequency clock generating circuit 213 generates high-frequency clock signals $VCLK_1$ and $VCLK_2$ having a phase different of 180 degrees. The time corresponding to the phase difference between the high-frequency clock signals $VCLK_1$ and $VCLK_2$ is ½ cycle of the high-frequency clock signal. The high-frequency clock signals $VCLK_1$ and $VCLK_2$ are supplied to the pixel-clock generating circuit 215 and the write control circuit 219. When the high-frequency clock signals $VCLK_1$ and $VCLK_2$ need not be distinguished, they will be collectively called the high-frequency clock signal VCLK in the following explanation. Moreover, for the sake of explanation, the time corresponding to the phase difference between the high-frequency clock signals $VCLK_1$ and $VCLK_2$ is also called "phase-difference corresponding time".

Figure 7:
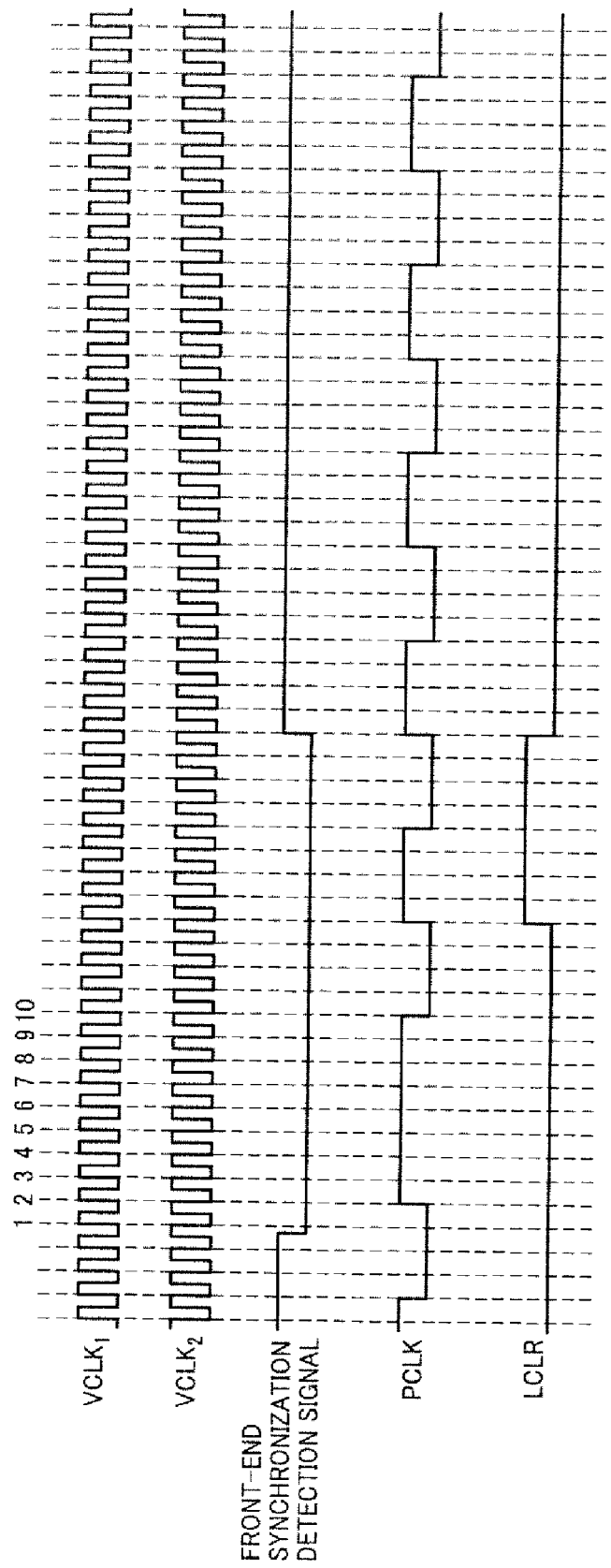
FIG. 7 is a timing chart for explaining an operation of a pixel-clock generating circuit shown in FIG. 5.

The pixel-clock generating circuit 215 generates a pixel clock signal PCLK to be an output reference of pixel (dot) data based on the high-frequency clock signal $VCLK_1$ from the high-frequency clock generating circuit 213. As shown in FIG. 7 as an example, the pixel clock signal PCLK is a clock signal that has a frequency of ⅛ of a frequency of the high-frequency clock signal $VCLK_1$. Moreover, the pixel-clock generating circuit 215 generates a line clear signal LCLR. The pixel clock signal PCLK and the line clear signal LCLR are supplied to the image-data generating circuit 216 and the write control circuit 219 in synchronization with the front-end synchronization detection signal.

Specifically, as shown in FIG. 7, with a rising timing of the high-frequency clock signal $VCLK_1$ immediately after the front-end synchronization detection signal is changed from the high level to the low level as a base point (first clock), the pixel clock signal PCLK is output in synchronization with the rising timing of the 10-th clock of the high-frequency clock signal $VCLK_1$. The line clear signal LCLR is changed from the low level to the high level at the first rising timing of the synchronized pixel clock signal PCLK, and it is changed from the high level to the low level at the next rising timing of the pixel clock signal PCLK.

Figure 8:
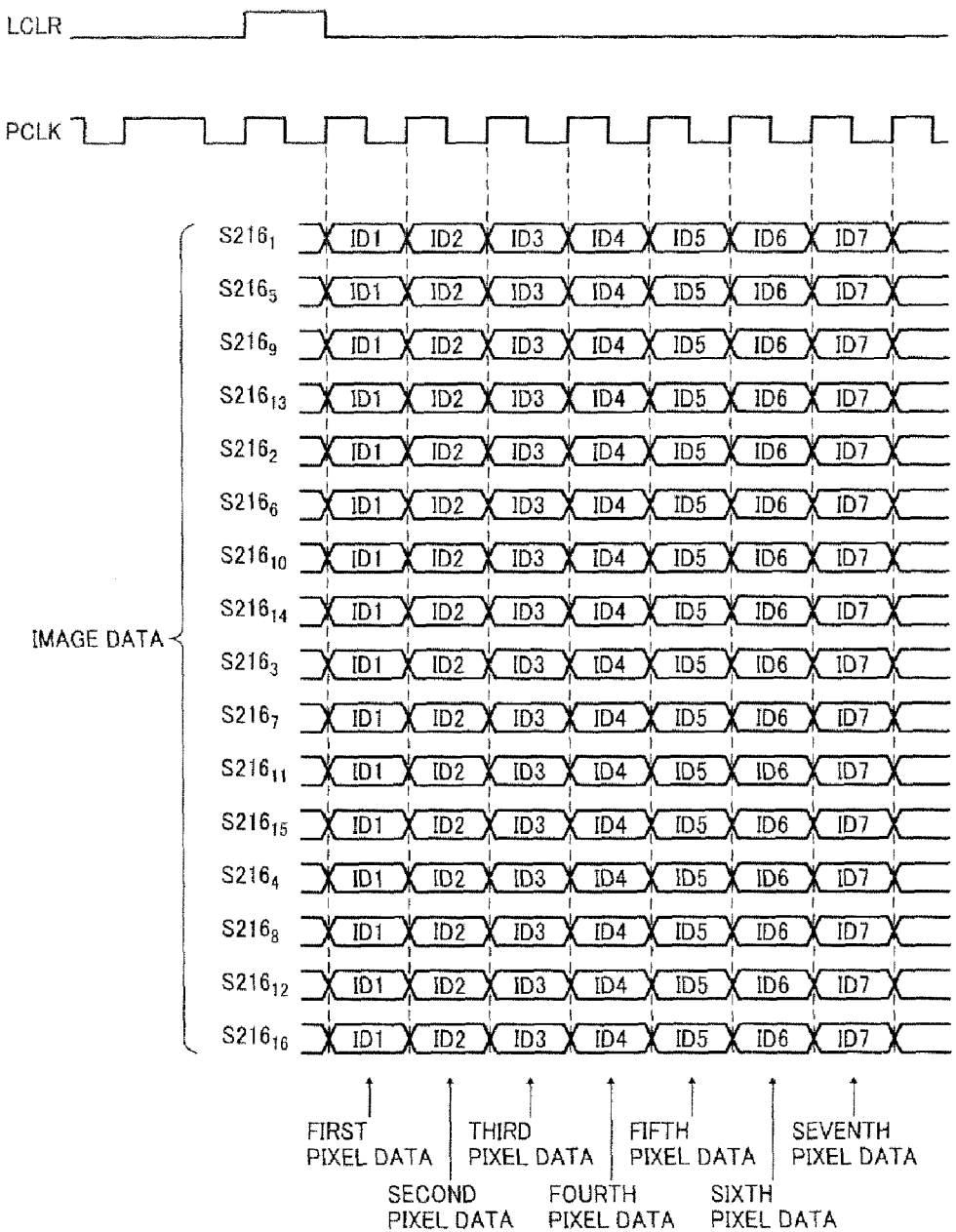
FIG. 8 is a timing chart for explaining an operation of an image-data generating circuit shown in FIG. 5.

Returning to FIG. 5, the image-data generating circuit 216 rasterizes the image information received from the upper-level device via the printer control device 1060 and generates image data representing gradation of each pixel for each light emitting unit with the pixel clock signal PCLK as a reference after performing a predetermined halftone process. Then, as shown in FIG. 8, as an example, when the image-data generating circuit 216 detects that the line clear signal LCLR changes from the low level to the high level, the image-data generating circuit 216 outputs image data $S216_1$ to $S216_{16}$ in order from a first pixel data ID1 to the write control circuit 219 in synchronization with the rising timing of the pixel clock signal PCLK. One piece of the pixel data is 4-bit data. The image data $S216_1$ corresponds to the light emitting unit ch1, the image data $S216_2$ corresponds to the light emitting unit ch2, . . . , and the image data $S216_{16}$ corresponds to the light emitting unit ch16.

Figure 9:
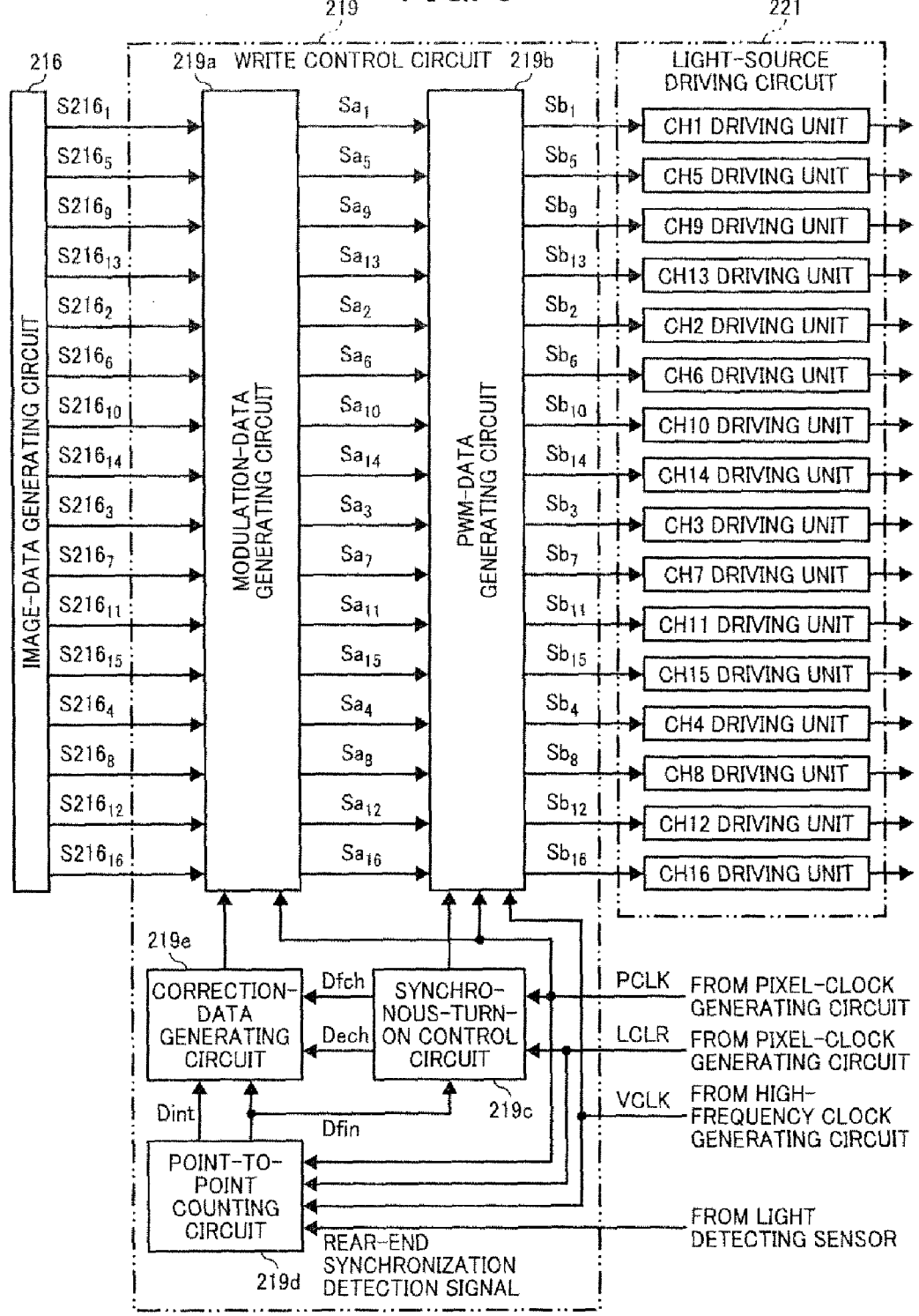
FIG. 9 is a schematic diagram illustrating a configuration of a write control circuit shown in FIG. 5.

As shown in FIG. 9, as an example, the write control circuit 219 includes a modulation-data generating circuit 219a, a PWM-data generating circuit 219b, a synchronous-turn-on control circuit 219c, a point-to-point counting circuit 219d, and a correction-data generating circuit 219e.

The point-to-point counting circuit 219d includes two counters, i.e., a first counter and a second counter. The point-to-point counting circuit 219d counts a time interval between the rising timings of the front-end synchronization detection signal and the rear-end synchronization detection signal and outputs it as count data Dint to the correction-data generating circuit 219e. Moreover, the point-to-point counting circuit 219d outputs a count end signal Dfin for notifying of an end of counting to the synchronous-turn-on control circuit 219c and the correction-data generating circuit 219e.

Figure 10:
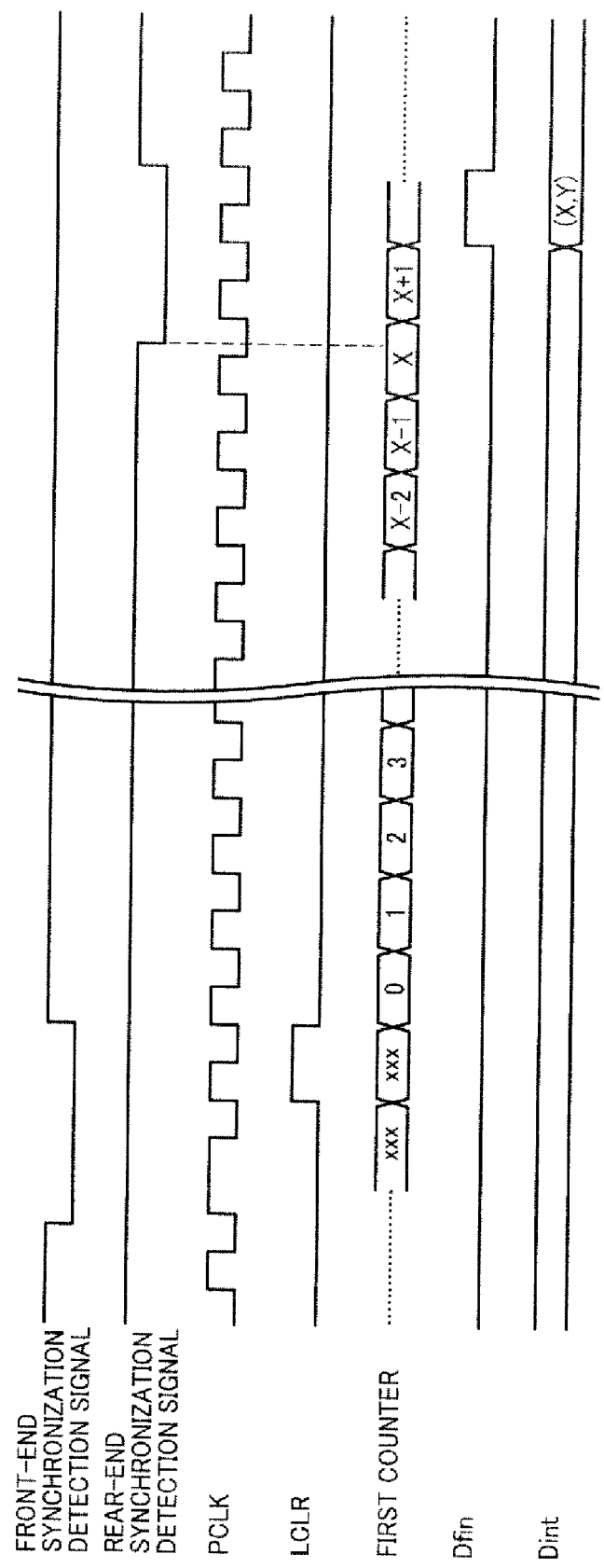
FIG. 10 is a timing chart for explaining an operation of a point-to-point counting circuit shown in FIG. 9.
Figure 11:
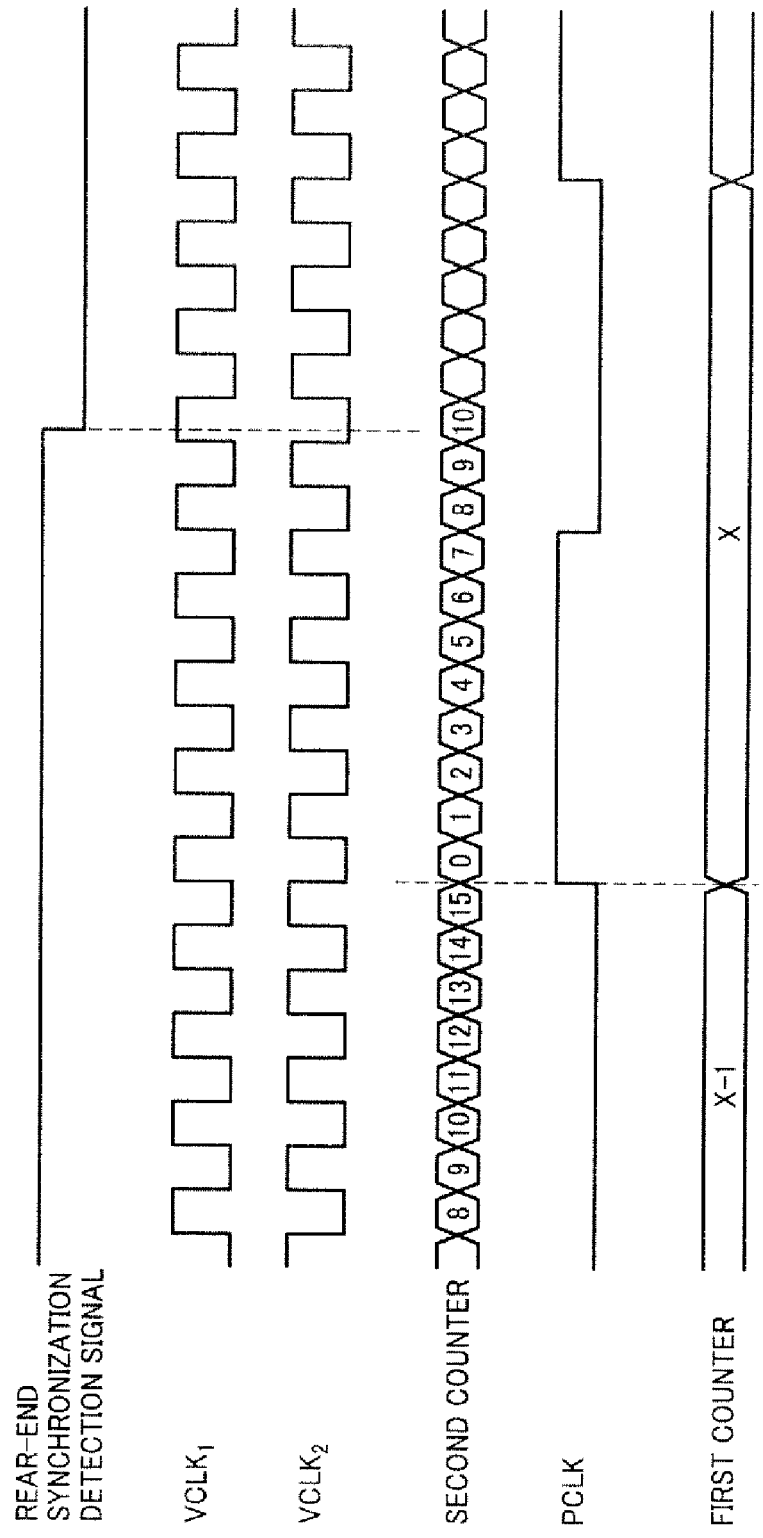
FIG. 11 is another timing chart for explaining an operation of the point-to-point counting circuit.

An operation of the point-to-point counting circuit 219d is explained with reference to timing charts shown in FIGS. 10 and 11. FIG. 11 is a detailed timing chart near the timing at which the rear-end synchronization detection signal changes from the high level to the low level.

(1-1) When the line clear signal LCLR changes from the low level to the high level, the values of the first and second counters are reset to "0" at the next rising timing of the pixel clock signal PCLK. The value of the first counter is counted up in synchronization with the rising timing of the pixel clock signal PCLK. The value of the second counter is counted up in synchronization with the rising timing of the high-frequency clock signals $VCLK_1$ and $VCLK_2$ (see FIG. 11).

(1-2) When the rear-end synchronization detection signal changes from the high level to the low level, the values of the first and second counters at this time are obtained. In FIG. 11, the value of the first counter is "X", and the value of the second counter is "10".

(1-3) The values of the first and second counters are output to the correction-data generating circuit 219e as the count data Dint. At the same time, the count end signal Dfin is changed from the low level to the high level. In the following explanation, the content of the count data Dint is represented in the form of (value of the first counter, value of the second counter).

(1-4) The count end signal Dfin is changed from the high level to the low level in synchronization with the next rising timing of the pixel clock signal PCLK.

Returning to FIG. 9, the synchronous-turn-on control circuit 219c selects the light emitting unit (hereinafter, "front-end-synchronization light emitting unit" in some cases) that emits light detected by the light sensor 18a and the light emitting unit (hereinafter, "rear-end-synchronization light emitting unit" in some cases) that emits light detected by the light sensor 18b, and generates a plurality of synchronous-turn-on signals (a ch1 synchronous-turn-on signal to a ch16 synchronous-turn-on signal) to turn on the selected light emitting units. The generated synchronous-turn-on signals are output to the PWM-data generating circuit 219b. The ch1 synchronous-turn-on signal corresponds to the light emitting unit ch1, the ch2 synchronous-turn-on signal corresponds to the light emitting unit ch2, ..., and the ch16 synchronous-turn-on signal corresponds to the light emitting unit ch16.

The synchronous-turn-on control circuit 219c notifies the correction-data generating circuit 219e of front-end-ch information Dfch for specifying the front-end-synchronization light emitting unit and rear-end-ch information Dech for specifying the rear-end-synchronization light emitting unit.

Figure 12:
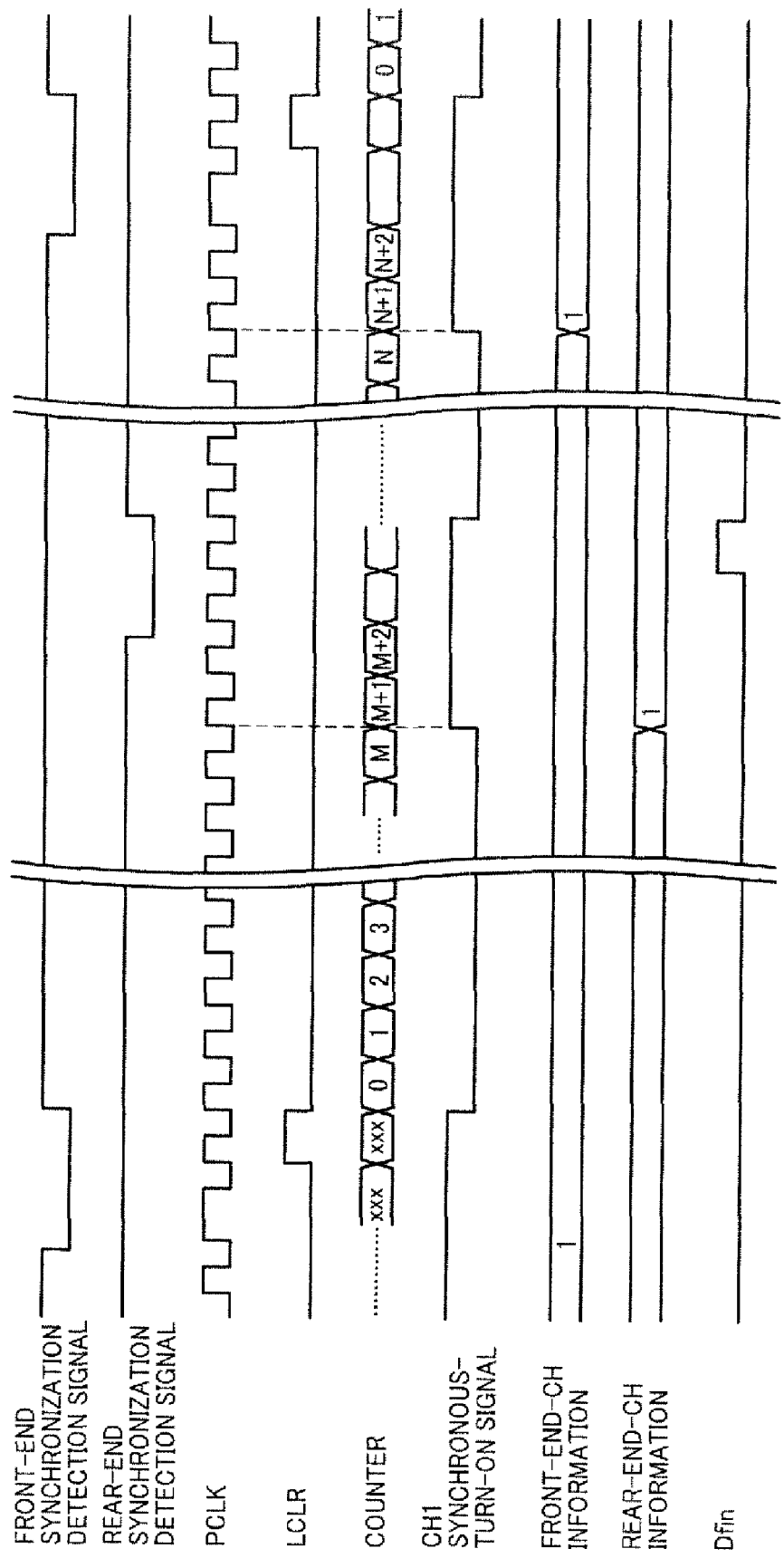
FIG. 12 is a timing chart for explaining an operation of a synchronous-turn-on control circuit shown in FIG. 9.

An operation of the synchronous-turn-on control circuit 219c is explained with reference to a timing chart as shown in FIG. 12. As an example, both of the front-end-synchronization light emitting unit and the rear-end-synchronization light emitting unit are the light emitting unit ch1.

(2-1) When the line clear signal LCLR changes from the low level to the high level, the value of the internal counter is reset to "0" in synchronization with the rising timing of the pixel clock signal PCLK. The value of the counter is counted up in synchronization with the rising timing of the pixel clock signal PCLK.

(2-2) When the value of the counter becomes the value ("M" in FIG. 12) corresponding to the preset turn-on timing for the rear-end-synchronization detection, the ch1 synchronous-turn-on signal is changed from the low level to the high level. Whereby, the light emitting unit ch1 is turned on. At the same time, the value "1" is notified as the rear-end-ch information Dech. All of the ch2 synchronous-turn-on signal to the ch16 synchronous-turn-on signal are in the low level.

(2-3) When the count end signal Dfin from the point-to-point counting circuit 219d is changed from the low level to the high level, the ch1 synchronous-turn-on signal is changed from the high level to the low level at the next rising timing of the pixel clock signal PCLK. Whereby, the light emitting unit ch1 is turned off.

(2-4) When the value of the counter becomes the value ("N" in FIG. 12) corresponding to the preset turn-on timing for the front-end-synchronization detection, the ch1 synchronous-turn-on signal is changed from the low level to the high level. Whereby, the light emitting unit ch1 is turned on. At the same time, the value "1" is notified as the front-end-ch information Dfch. All of the ch2 synchronous-turn-on signal to the ch16 synchronous-turn-on signal are in the low level.

(2-5) When the line clear signal LCLR is changed from the low level to the high level, the value of the counter is reset to "0" and the ch1 synchronous-turn-on signal is changed from the high level to the low level in synchronization with the next rising timing of the pixel clock signal PCLK. Whereby, the light emitting unit ch1 is turned off.

Figure 13:
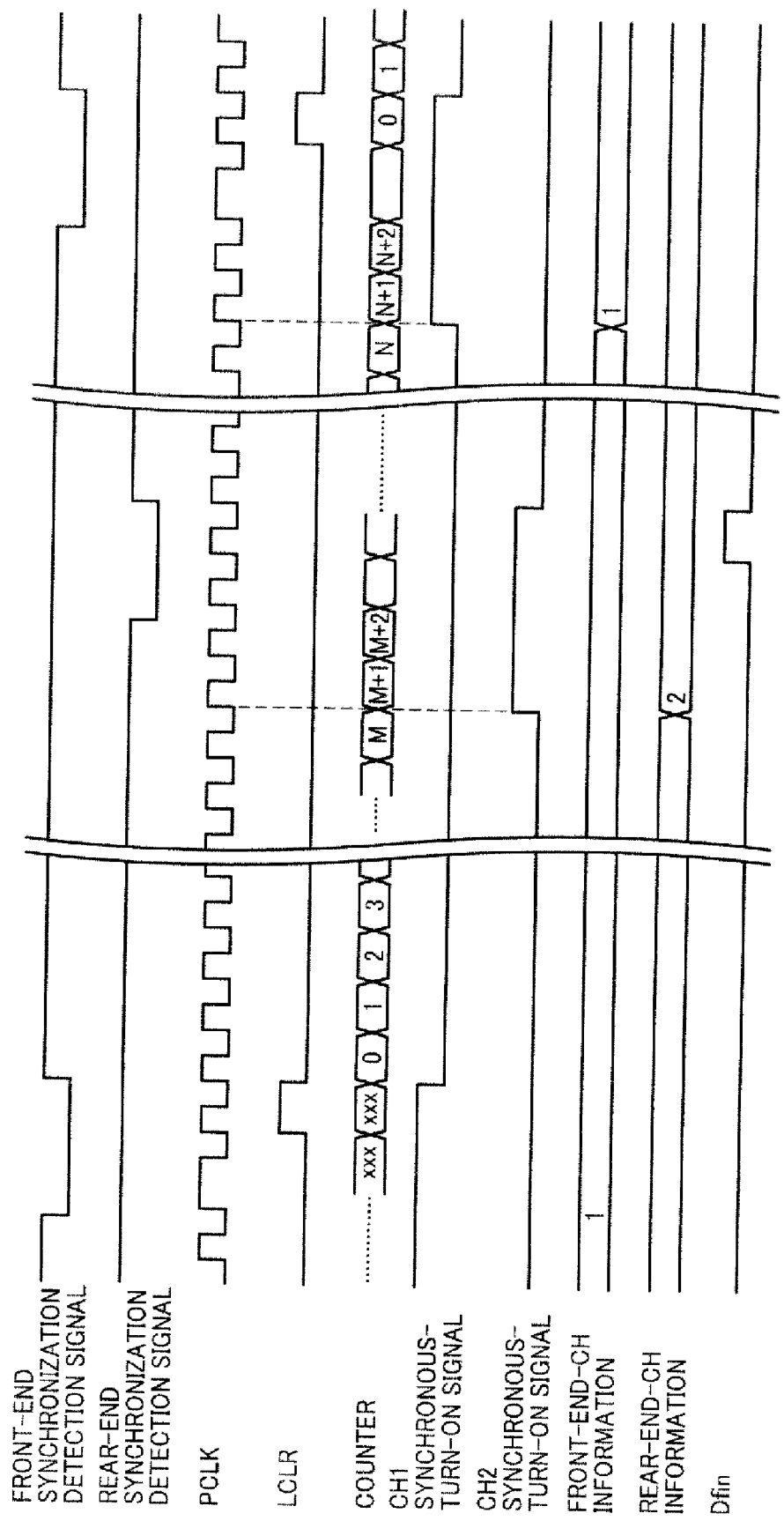
FIG. 13 is another timing chart for explaining an operation of the synchronous-turn-on control circuit.

The front-end-synchronization light emitting unit and the rear-end-synchronization light emitting unit can be different light emitting units. For example, FIG. 13 shows a timing chart in which the light emitting unit ch1 is the front-end-synchronization light emitting unit and the light emitting unit ch2 is the rear-end-synchronization light emitting unit. In this case, the signal level of the ch2 synchronous-turn-on signal is changed instead of the ch1 synchronous-turn-on signal in above described (2-2) and (2-3).

Returning to FIG. 9, the correction-data generating circuit 219e generates correction data for each light emitting unit based on the count data Dint, the count end signal Dfin, the front-end-ch information Dfch, and the rear-end-ch information Dech.

Figure 14:
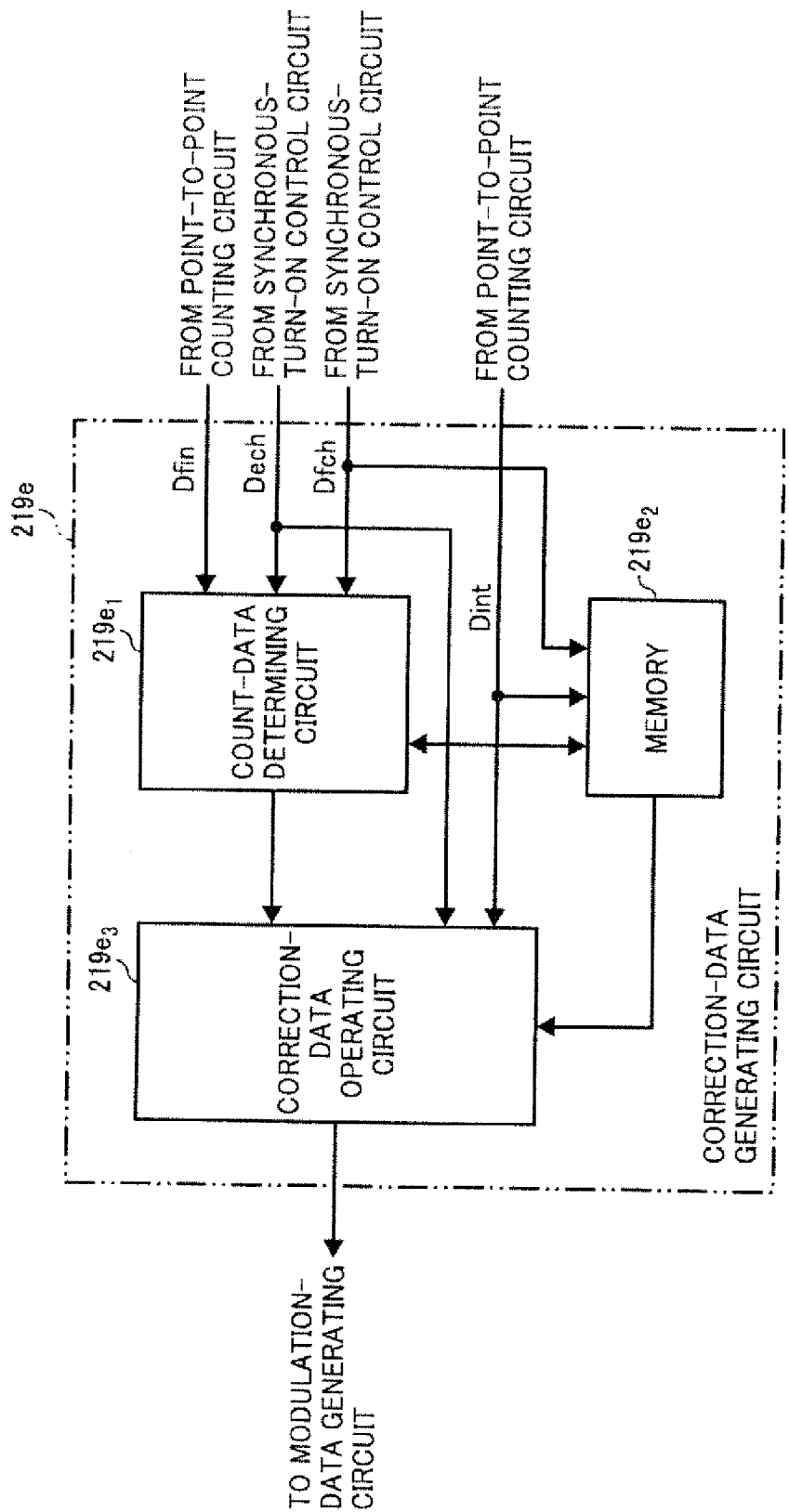
FIG. 14 is a schematic diagram for explaining a configuration of a correction-data generating circuit shown in FIG. 9.

As shown in FIG. 14, the correction-data generating circuit 219e includes a count-data determining circuit $219e_1$, a memory $219e_2$, and a correction-data operating circuit $219e_3$.

When the count-data determining circuit $219e_1$ detects the end of the counting based on the count end signal Dfin, the count-data determining circuit $219e_1$ determines whether the light emitting unit (hereinafter, "Dfch-specified light emitting unit") specified based on the front-end-ch information Dfch is the same as the light emitting unit (hereinafter, "Dech-specified light emitting unit") specified based on the rear-end-ch information Dech. If the count-data determining circuit $219e_1$ determines that the Dfch-specified light emitting unit and the Dech-specified light emitting unit are the same, the input count data Dint is retained in the memory $219e_2$ as reference data. At this time, the front-end-ch information Dfch is also retained in the memory $219e_2$ as reference light-emitting-unit data.

On the other hands, if the count-data determining circuit $219e_1$ determines that the Dfch-specified light emitting unit and the Dech-specified light emitting unit are different, the count-data determining circuit $219e_1$ determines whether the Dfch-specified light emitting unit is the same as the light emitting unit specified based on the reference light-emitting-unit data. If the count-data determining circuit $219e_1$ determines that these light emitting units are the same, the count-data determining circuit $219e_1$ instructs the correction-data operating circuit $219e_3$ to calculate the correction data. On the other hands, if the count-data determining circuit $219e_1$ determines that these light emitting units are different, the count-data determining circuit $219e_1$ does not perform any operation.

The correction-data operating circuit $219e_3$ obtains a difference between the reference data retained in the memory $219e_2$ and the count data Dint at this time as correction data Dmod for the Dech-specified light emitting unit, based on the instruction from the count-data determining circuit $219e_1$. For example, when the reference data retained in the memory $219e_2$ is (X1,Y1) and the count data Dint at this time is (X2,Y2), the correction data Dmod is obtained by Equation (1). The value "16" in Equation (1) indicates that one cycle of a pixel clock signal (hereinafter, "one-pixel clock" in some cases) corresponds to 16 times of ½ cycle of a high-frequency clock signal (hereinafter, "½ high-frequency clock" in some cases).

$$Dmod=(X1\times16+Y1)-(X2\times16+Y2) \quad (1)$$

For example, when the correction data Dmod obtained by Equation (1) is expressed in binary form of 11 bits, low 4 bits (bit 3 to bit 0) are values in units of ½ high-frequency clock and high 7 bits (bit 10 to bit 4) are values in units of one-pixel clock.

Figure 15:
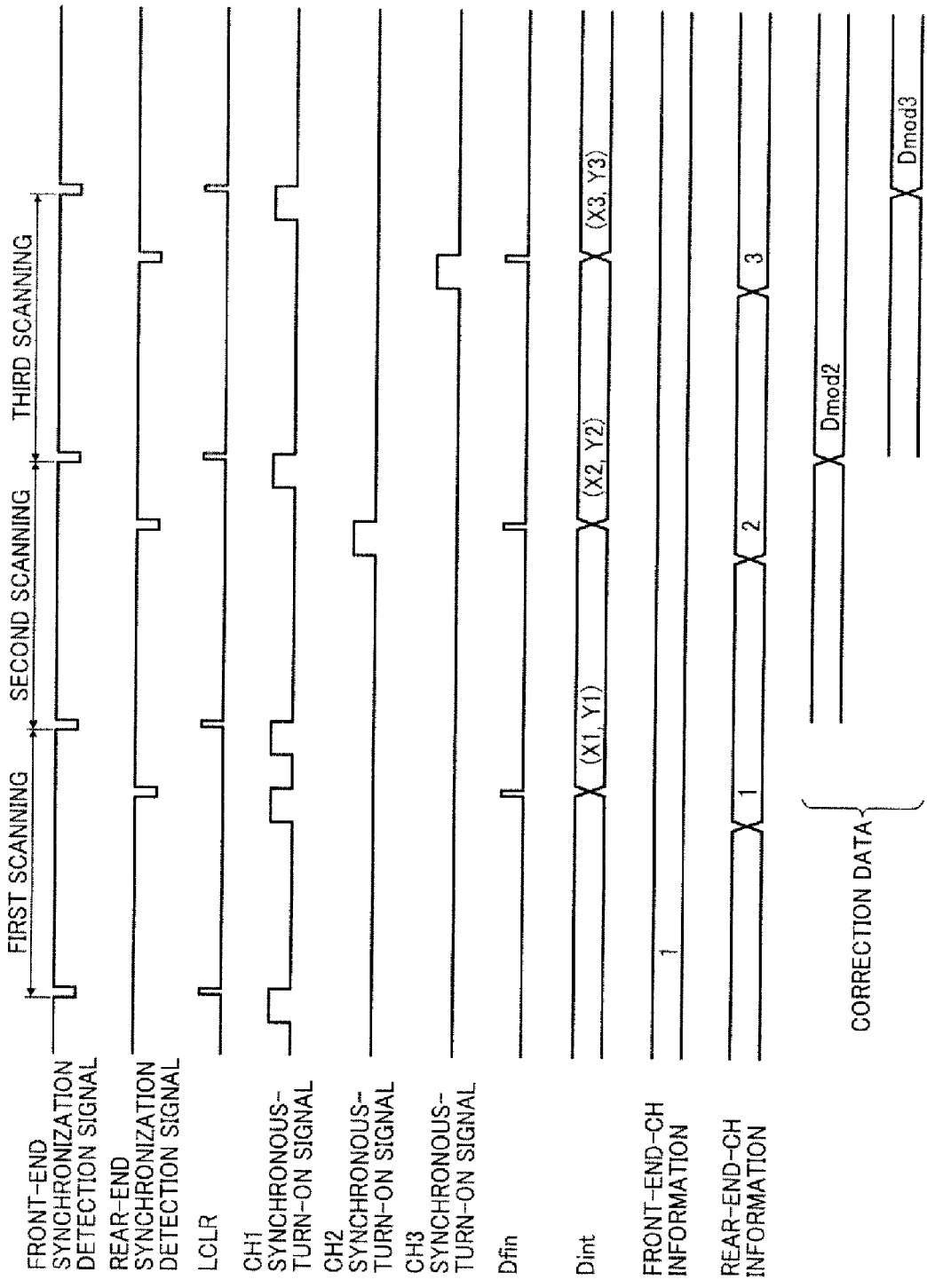
FIG. 15 is a timing chart for explaining an operation of the correction-data generating circuit.

A specific operation of the correction-data generating circuit 219e is explained with reference to a timing chart shown in FIG. 15. The front-end-synchronization light emitting unit is the light emitting unit ch1 in any of 1-st to 16-th scannings. The rear-end-synchronization light emitting unit is the light emitting unit ch1 in the 1-st scanning, the light emitting unit ch2 in the 2-nd scanning, the light emitting unit ch3 in the 3-rd scanning, . . . , and the light emitting unit ch16 in the 16-th scanning. In FIG. 15, only the 1-st to the 3-rd scannings are shown.

(3-1) In the 1-st scanning, when the count end is detected based on the count end signal Dfin, the Dfch-specified light emitting unit is compared with the Dech-specified light emitting unit. Because both of the Dfch-specified light emitting unit and the Dech-specified light emitting unit are the light emitting unit ch1, the input count data ((X1,Y1) in this case) is retained as the reference data.

(3-2) In the 2-nd scanning, when the count end is detected based on the count end signal Dfin, the Dfch-specified light emitting unit is compared with the Dech-specified light emitting unit. Because the Dfch-specified light emitting unit is the light emitting unit ch1 and the Dech-specified light emitting unit is the light emitting unit ch2, a difference between the input count data ((X2,Y2) in this case) and the reference data (X1,Y1) is obtained to be output as correction data Dmod2 for the light emitting unit ch2.

(3-3) In the 3-rd scanning, when the count end is detected based on the count end signal Dfin, the Dfch-specified light emitting unit is compared with the Dech-specified light emitting unit. Because the Dfch-specified light emitting unit is the light emitting unit ch1 and the Dech-specified light emitting unit is the light emitting unit ch3, a difference between the input count data ((X3,Y3) in this case) and the reference data (X1,Y1) and is obtained to be output as correction data Dmod3 for the light emitting unit ch3.

In the similar manner, when the count end is detected based on the count end signal Dfin in the 4-th to 16-th scannings, correction data Dmod4 to Dmod16 for the light emitting units ch4 to ch16 is output.

The correction data is obtained before performing the actual writing, and the writing is performed by using the obtained correction data. The correction data can be obtained in an arbitrary timing.

Figure 16:
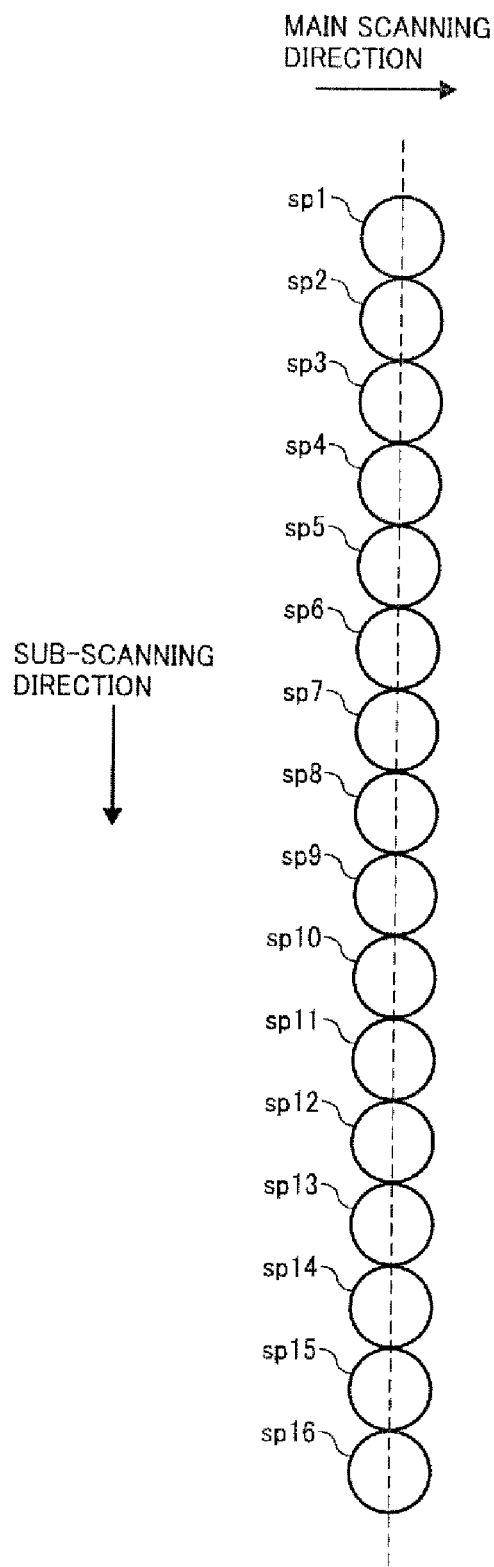
FIG. 16 is a schematic diagram for explaining scanning of a surface of the photosensitive drum with a light spot when writing is started.

Returning to FIG. 9, the modulation-data generating circuit 219a converts the image data $S216_1$ to $S216_{16}$ from the image-data generating circuit 216 into modulation data $Sa_1$ to $Sa_{16}$. Moreover, the modulation-data generating circuit 219a corrects the timing of outputting the modulation data $Sa_1$ to $Sa_{16}$ based on the input correction data Dmod1 to Dmod16. Whereby, the light spot sp1 to sp16 by each light emitting unit at the time of starting the writing are aligned on the photosensitive drum 1030 with respect to the main-scanning direction as shown in FIG. 16.

Figure 17A:
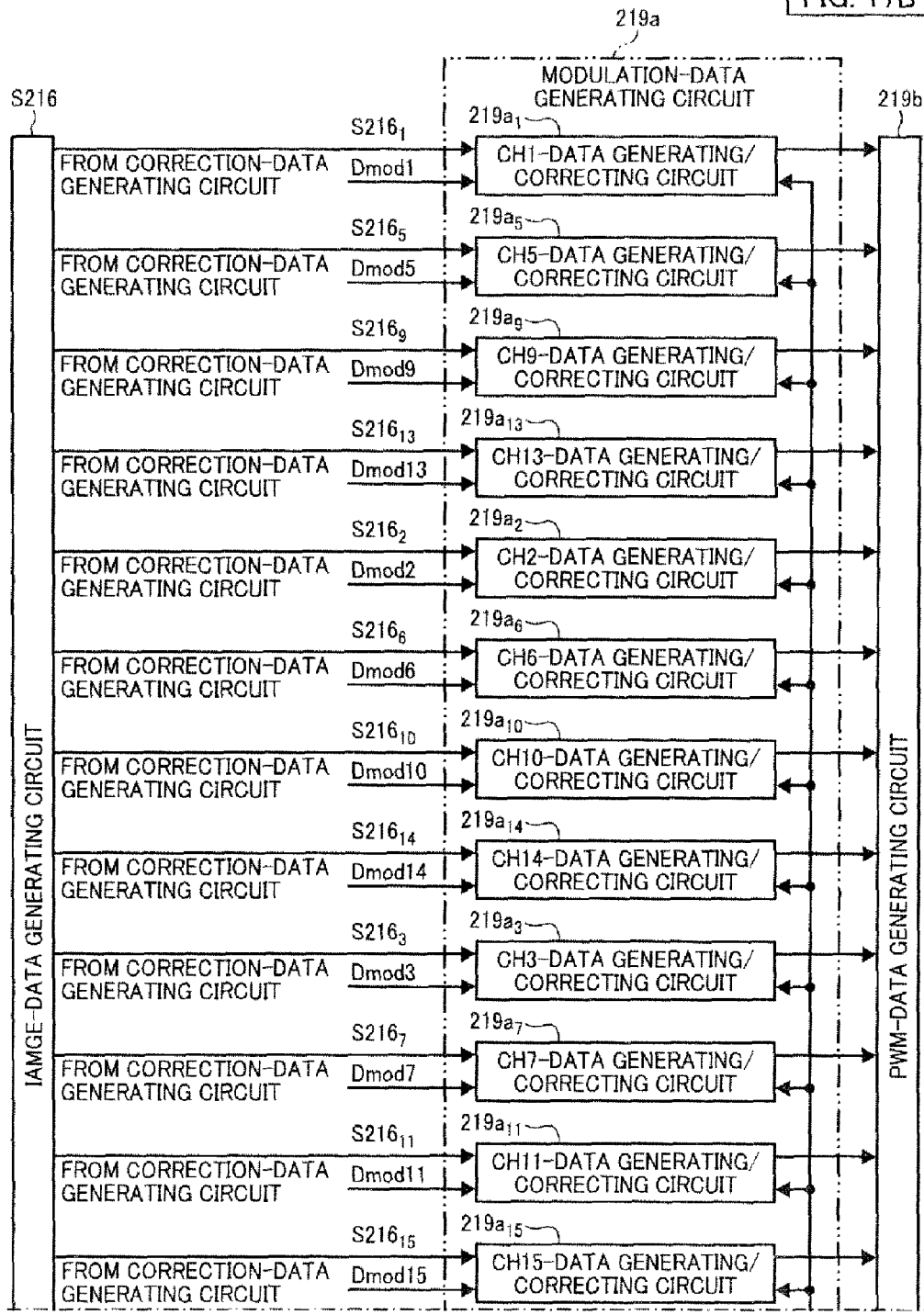
FIG. 17 is a schematic diagram for explaining a configuration of a modulation-data generating circuit shown in FIG. 9.
Figure 17B:
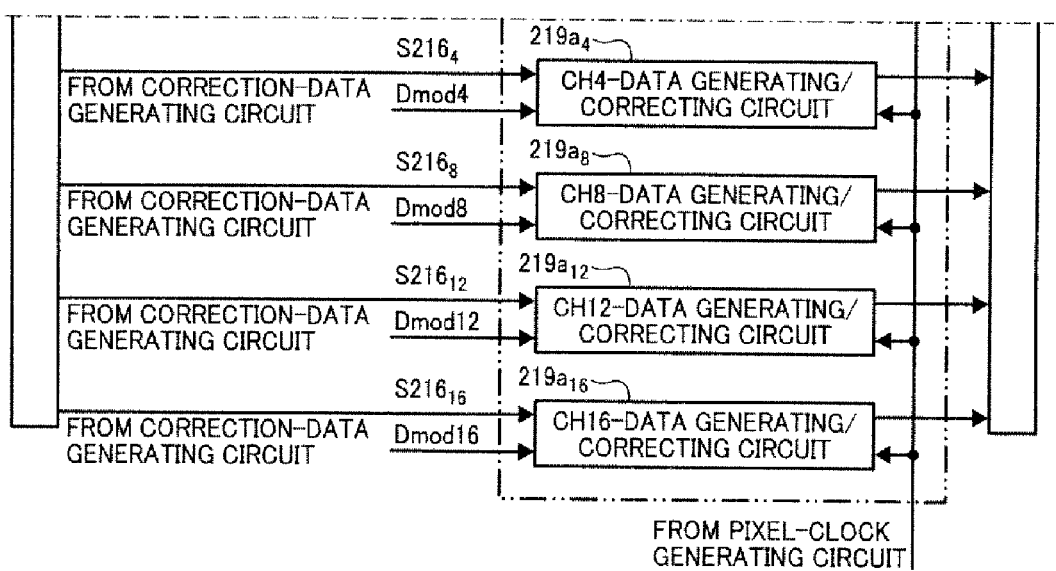

As shown in FIG. 17, the modulation-data generating circuit 219a includes a ch1-data generating/correcting circuit $219a_1$, a ch2-data generating/correcting circuit $219a_2$, a ch3-data generating/correcting circuit $219a_3$, . . . , and a ch16-data generating/correcting circuit $219a_{16}$.

Each of the ch1-data generating/correcting circuit $219a_1$ to the ch16-data generating/correcting circuit $219a_{16}$ has the similar configuration, and converts corresponding image data into modulation data and corrects timing of outputting the modulation data based on corresponding correction data.

Figure 18:
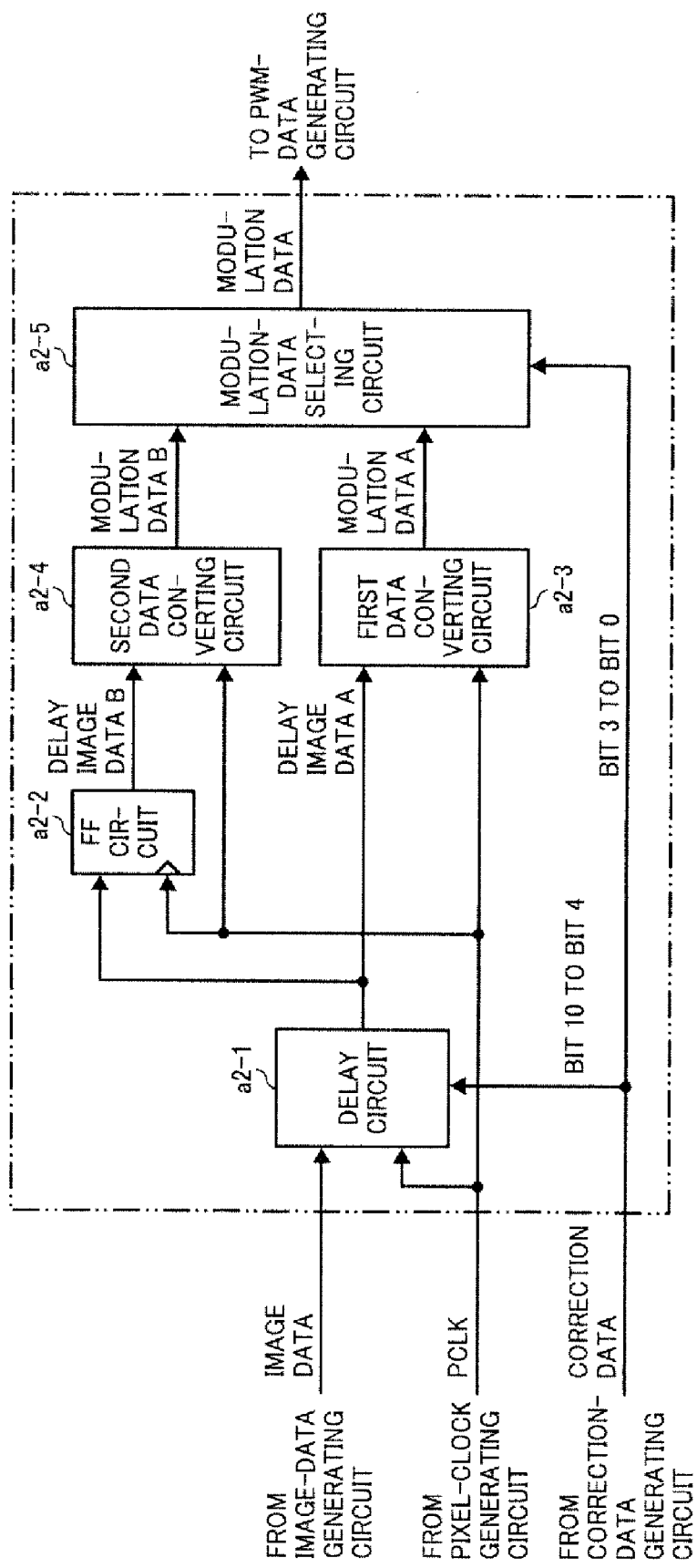
FIG. 18 is a schematic diagram for explaining a configuration of a data generating/correcting circuit shown in FIG. 17.

As shown in FIG. 18, each of the ch1-data generating/correcting circuit $219a_1$ to the ch16-data generating/correcting circuit $219a_{16}$ includes a delay circuit a2-1, a flip-flop (FF) circuit a2-2, a first data converting circuit a2-3, a second data converting circuit a2-4, and a modulation-data selecting circuit a2-5.

The delay circuit a2-1 delays the input image data by the value of high 7 bits (bit 10 to bit 4) of the input correction data in units of one pixel clock and outputs it as delay image data A.

The FF circuit a2-2 further delays the delay image data A by one pixel clock and outputs it as delay image data B.

The first data converting circuit a2-3 modulates the input delay image data A based on a conversion table as shown in FIG. 19 and outputs it as modulation data A.

The second data converting circuit a2-4 modulates the input delay image data B based on the conversion table as shown in FIG. 19 and outputs it as modulation data B.

One pixel data in each of the modulation data A and the modulation data B is 16-bit data, and is output to the modulation-data selecting circuit a2-5 as parallel data.

The modulation-data selecting circuit a2-5 refers to a selection table as shown in FIG. 20, selects 16 bits from the modulation data A and the modulation data B in accordance with the value of low 4 bits (bit 3 to bit 0) of the input correction data, and outputs it as parallel modulation data.

For example, if the value of the low 4 bits of the correction data is "0000", a bit 15 to a bit 0 of the modulation data A are selected. If the value of the low 4 bits of the correction data is "0001", a bit 14 to a bit 0 of the modulation data A and a bit 15 of the modulation data B are selected. If the value of the low 4 bits of the correction data is "0010", a bit 13 to a bit 0 of the modulation data A and a bit 14 and a bit 15 of the modulation data B are selected. If the value of the low 4 bits of the correction data is "0011", a bit 12 to a bit 0 of the modulation data A and a bit 15 to a bit 13 of the modulation data B are selected.

An operation of each of the ch1-data generating/correcting circuit $219a_1$ to the ch16-data generating/correcting circuit $219a_{16}$ is explained with reference to FIG. 21. As an example, correction data is "00001101100" in binary. In other words, the value of the high 7 bits of the correction data is "6" in decimal, and the value of the low 4 bits is "1100" in binary.

When image data is input, because the value of the high 7 bits of the correction data is "6" in decimal, the delay image data A becomes data that is delayed by six pixel clocks with respect to the image data. For example, image data IDn input at timing T1 becomes data of the delay image data A at timing T2 (=T1+(six pixel clocks)). Because the delay image data B is data obtained by delaying the delay image data A by one pixel clock, image data IDn-1 before the image data IDn becomes data of the delay image data B at the timing T2.

At timing T3 (=T2+(one pixel clock)), the modulation data A is data MDn that is obtained by modulating the image data IDn and the modulation data B is data MDn-1 that is obtained by modulating the image data IDn-1.

At this time, because the value of the low 4 bits of the correction data is "1100" in binary, a bit 3 to a bit 0 of the modulation data A and a bit 15 to a bit 4 of modulation data B are selected in the modulation-data selecting circuit a2-5. In other words, MDn[3:0] and MDn-1[15:4] are output as modulation data.

In the present embodiment, because the light emitting timing of the light emitting unit ch1 is used as a reference, the correction data Dmod1 of the light emitting unit ch1 is "00000000000".

Returning to FIG. 9, the PWM-data generating circuit 219b converts the modulation data $Sa_1$ to $Sa_{16}$ from the modulation-data generating circuit 219a into serial PWM data $Sb_1$ to $Sb_{16}$.

Figure 22B:
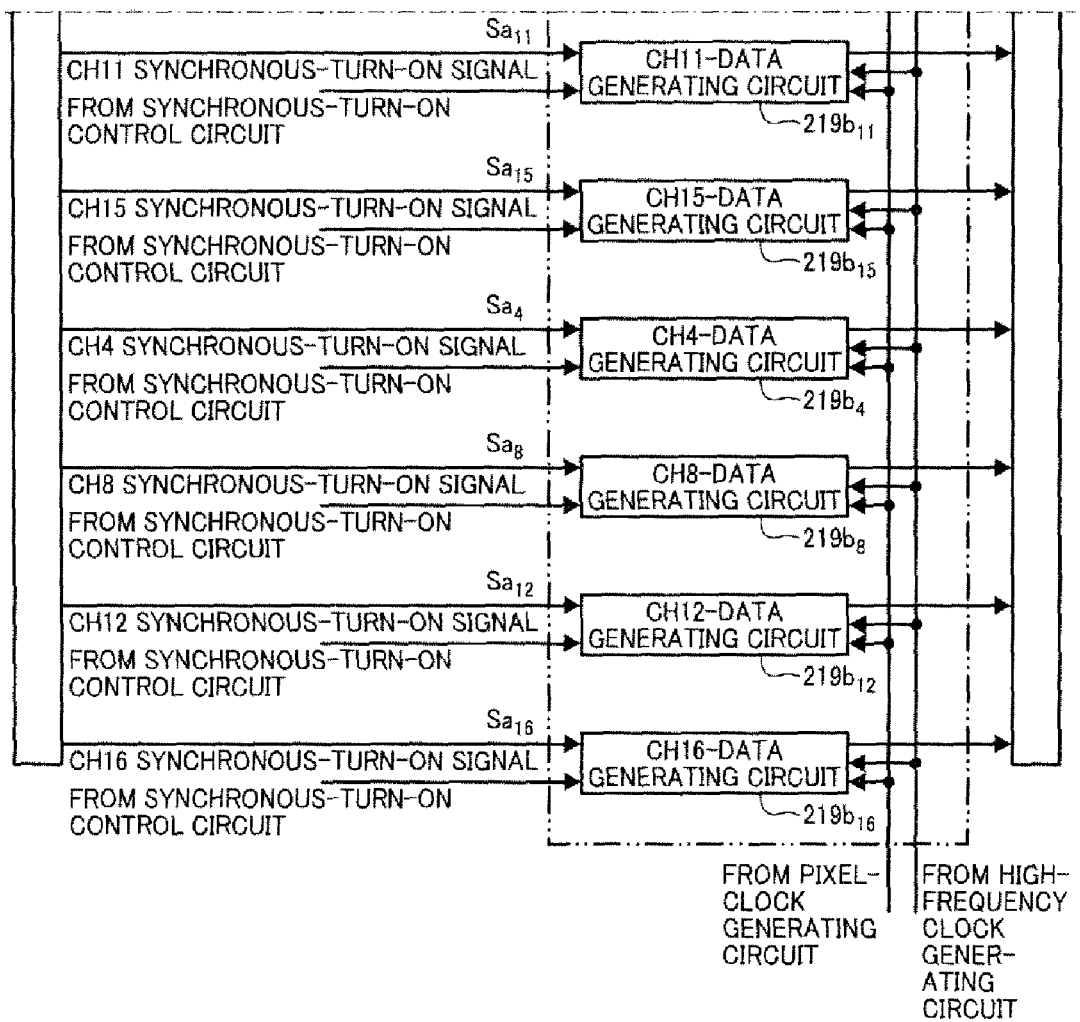
FIG. 22 is a schematic diagram for explaining a configuration of a pulse-width-modulation-data (PWM-data) generating circuit shown in FIG. 9.

As shown in FIG. 22, the PWM-data generating circuit 219b includes a ch1-data generating circuit $219b_1$ that converts the modulation data $Sa_1$ into the PWM data $Sb_1$, a ch2-data generating circuit $219b_2$ that converts the modulation data $Sa_2$ into the PWM data $Sb_2$, a ch3-data generating circuit $219b_3$ that converts the modulation data $Sa_3$ into the PWM data $Sb_3$, . . . , and a ch16-data generating circuit $219b_{16}$ that converts the modulation data $Sa_{16}$ into the PWM data $Sb_{16}$.

Figure 23:
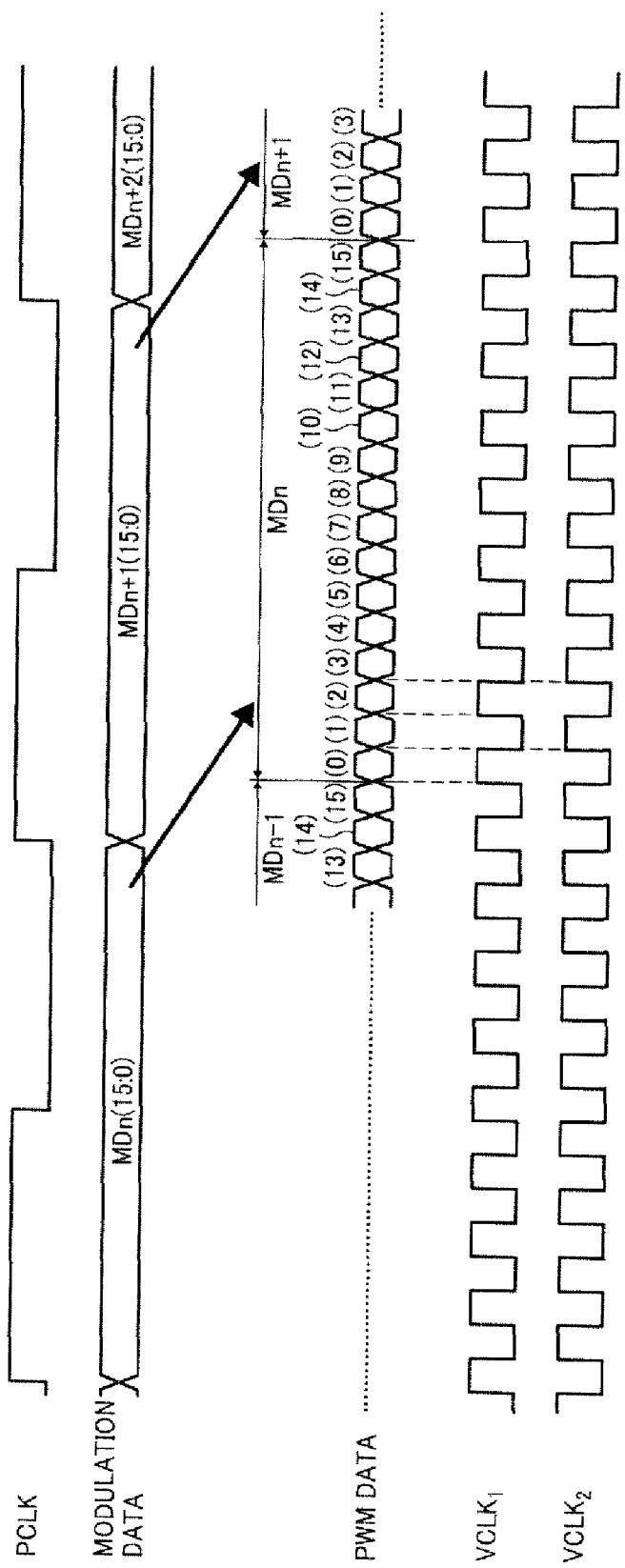
FIG. 23 is a timing chart for explaining an operation of a data generating circuit shown in FIG. 22.
Figure 24:
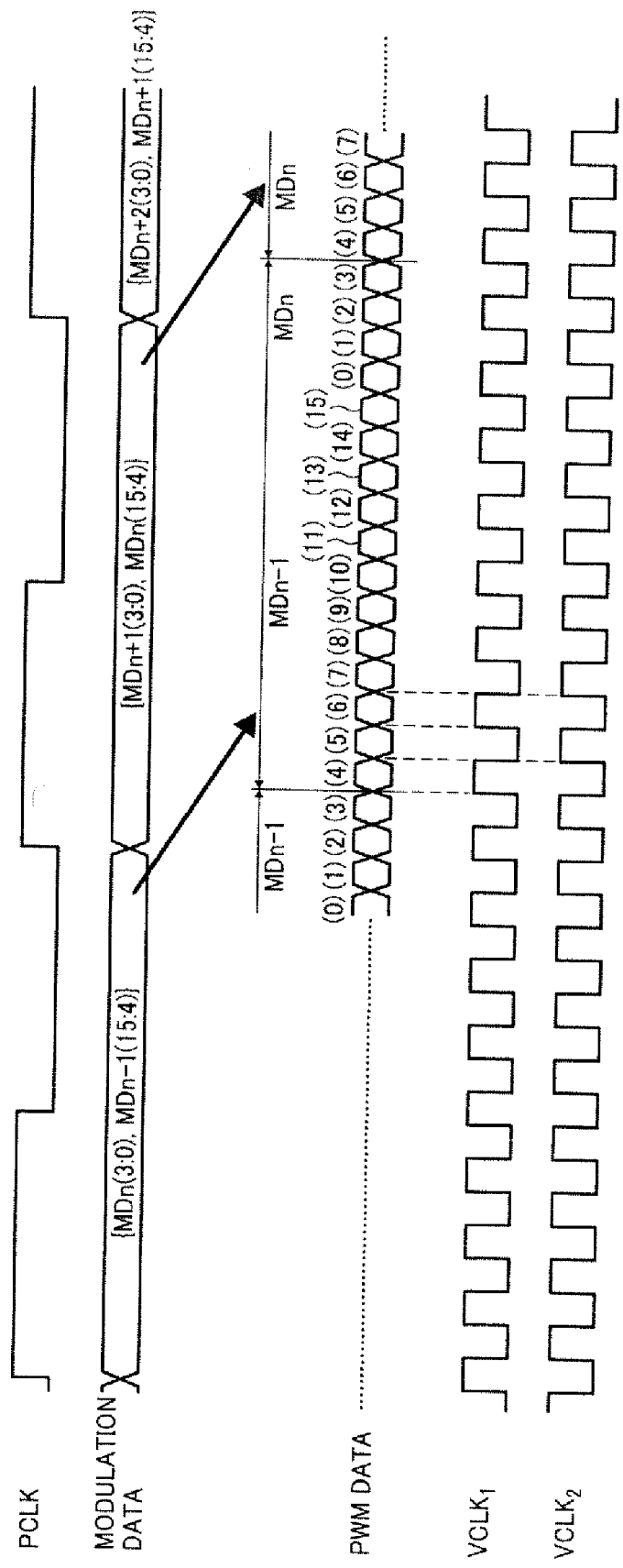
FIG. 24 is another timing chart for explaining an operation of the data generating circuit.

Each of the ch1-data generating circuit $219b_1$ to the ch16-data generating circuit $219b_{16}$ has the similar configuration, and converts corresponding modulation data into serial PWM data. As shown in FIGS. 23 and 24 as an example, 16-bit modulation data is output bit by bit from a lower bit side at the rising timing of the high-frequency clock signals $VCLK_1$ and $VCLK_2$, i.e., for each ½ high-frequency clock.

FIG. 23 shows a case in which modulation data consists of a bit 15 to a bit 0 of the modulation data A, and FIG. 24 shows a case in which modulation data consists of a bit 3 to a bit 0 of the modulation data A and a bit 15 to a bit 4 of the modulation data B. In FIG. 24, MDn[0] is output at the timing that is delayed by twelve ½ high-frequency clocks from the case in FIG. 23. In this manner, the timing of writing by each light emitting unit can be delayed in units of ½ high-frequency clock.

In each of the ch1-data generating circuit $219b_1$ to the ch16-data generating circuit $219b_{16}$, when an input synchronous-turn-on signal is in the high level, PWM data is forcibly kept in the high level.

Returning to FIG. 9, the light-source driving circuit 221 includes a plurality of driving units (ch1 driving unit to ch16 driving unit) corresponding to the light emitting units ch1 to ch16. PWM data is input from the PWM-data generating circuit 219b to each of the driving units. A signal output from each of the driving units is supplied to a corresponding light emitting unit. In other words, the light emitting unit ch1 is driven by the ch1 driving unit based on the PWM data $Sb_1$, the light emitting unit ch2 is driven by the ch2 driving unit based on the PWM data $Sb_2$, . . . , and the light emitting unit ch16 is driven by the ch1 driving unit based on the PWM data $Sb_{16}$.

As is apparent from the above explanation, a light-source driving device is configured with the scan control device 22 in the optical scanning device 1010 according to the present embodiment.

Moreover, a counting method is performed by the scan control device 22 in the optical scanning device 1010.

According to the present embodiment, the scan control device 22 includes the high-frequency clock generating circuit 213 that generates the high-frequency clock signals $VCLK_1$ and $VCLK_2$ of which phases are different from each other, the image-data generating circuit 216 that generates a plurality of pieces of image data (write data) corresponding to a plurality of light emitting units in accordance with image information, the write control circuit 219 that generates a plurality of pieces of modulation data corresponding to the light emitting units based on the image data and adjusts the timing of outputting the modulation data individually in units of the phase-difference corresponding time, and the light-source driving circuit 221 that drives the light emitting units based on a plurality of pieces of PWM data output from the write control circuit 219. Therefore, the timing of turning on the light emitting units can be controlled in real time with higher accuracy than in a conventional technique.

Moreover, because the write control circuit 219 includes the synchronous-turn-on control circuit 219c, the point-to-point counting circuit 219d, and the correction-data generating circuit 219e, deviation of the timing of starting writing by each of the light emitting units ch2 to ch16 with respect to the light emitting unit ch1 can be obtained as correction data individually in units of the phase-difference corresponding time in real time with higher accuracy than in a conventional technique. Therefore, the timing of turning on the light emitting units can be controlled in real time with higher accuracy than in a conventional technique.

Furthermore, because the write control circuit 219 includes the modulation-data generating circuit 219a, the timing of outputting a plurality of pieces of modulation data can be adjusted individually in units of the phase-difference corresponding time based on correction data so that timing of starting writing by the light emitting units agrees with each other.

Moreover, the modulation-data generating circuit 219a includes the delay circuit a2-1 that delays an input signal by the value of high 7 bits (first correction data) of correction data in units of one pixel clock, the FF circuit a2-2 that delays a signal output from the delay circuit a2-1 by one pixel clock, and the modulation-data selecting circuit a2-5 that selects a plurality of pieces of data from among parallel data obtained from a signal output from the delay circuit a2-1 and a signal output from the FF circuit a2-2 in accordance with the value of low 4 bits (second correction data) of the correction data. Therefore, the timing of outputting modulation data can be adjusted with a simple circuit configuration.

Furthermore, because the optical scanning device 1010 includes the scan control device 22, high-density optical scanning can be performed with high accuracy.

Moreover, because the scan control device 22 can appropriately obtain correction data in almost real time in accordance with change in optical characteristics of optical components or positional relationship between optical components due to temperature change, temporal change, or the like, so that writing positions on a plurality of scanning lines can be aligned stably.

Furthermore, because the laser printer 1000 includes the optical scanning device 1010 that can perform high-density optical scanning with high accuracy, a high quality image can be formed at high speed.

In the present embodiment, the delay circuit a2-1 can be configured to include a shift register and a selector circuit. In this case, the number of stages of the shift register is determined in accordance with the distance between a reference light emitting unit and other light emitting units in the M direction. Whereby, a circuit can be configured more efficiently, so that the circuit can be made small. As an example, FIG. 25 is a table representing a second-row spot position, a third-row spot position, and a fourth-row spot position from a first-row spot position on the surface of the photosensitive drum (scan target surface) in units of number of pixels when all of the light emitting units are simultaneously turned on, under the condition that a magnification of an optical system is supposed to change in the range of four to six times due to temperature change or temporal change. The resolution is 1200 dot per inch (dpi) (21 μm/dot).

In this case, when the first-row light emitting units are used as a reference, as shown in FIG. 26, a 9-stage shift register is needed in a delay circuit corresponding to the second-row light emitting units, an 18-stage shift register is needed in a delay circuit corresponding to the third-row light emitting units, and a 26-stage shift register is needed in a delay circuit corresponding to the fourth-row light emitting units.

Figure 27:
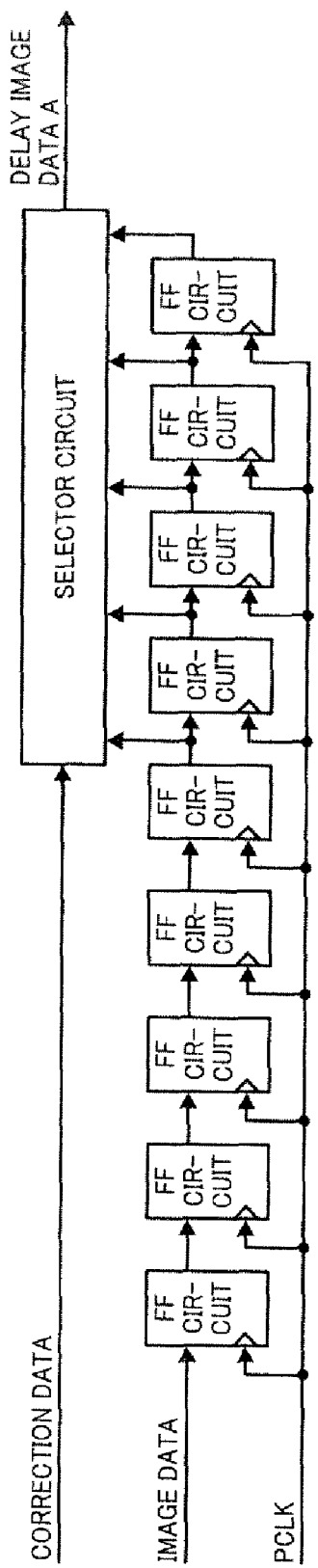
FIG. 27 is a schematic diagram for explaining the modified example of the delay circuit.

In the delay circuit corresponding to the second-row light emitting units, as shown in FIG. 27, a signal output from each of the 5-th stage to the 9-th stage shift registers is input to the selector circuit. High 7 bits of correction data are also input to the selector circuit, and any of the signals output from the 5-th stage to the 9-th stage shift registers is selected in accordance with the value of the high 7 bits of the correction data to be output as the delay image data A. Specifically, when the value of the high 7 bits of the correction data is "5", the signal output from the 5-th stage shift register is selected. When the value of the high 7 bits of the correction data is "6", the signal output from the 6-th stage shift register is selected. When the value of the high 7 bits of the correction data is "7", the signal output from the 7-th stage shift register is selected. When the value of the high 7 bits of the correction data is "8", the signal output from the 8-th stage shift register is selected. When the value of the high 7 bits of the correction data is "9", the signal output from the 9-th stage shift register is selected.

In the delay circuit corresponding to the third-row light emitting units, a signal output from each of the 11-th stage to the 18-th stage shift registers is input to the selector circuit, and any of the signals output from the 11-th stage to the 18-th stage shift registers is selected in accordance with the value of the high 7 bits of the correction data. Furthermore, in the delay circuit corresponding to the fourth-row light emitting units, a signal output from each of the 17-th stage to the 26-th stage shift registers is input to the selector circuit, and any of the signal outputs from the 17-th stage to 26-th stage shift registers is selected in accordance with the value of the high 7 bits of the correction data.

Moreover, in the present embodiment, two high-frequency clock signals of which phases are different by 180 degrees are used as a plurality of high-frequency clock signals; however, the present invention is not limited thereto. For example, use of a plurality of high-frequency clock signals with a smaller phase difference can align writing positions on a plurality of scanning lines with higher temporal accuracy.

Figure 28:
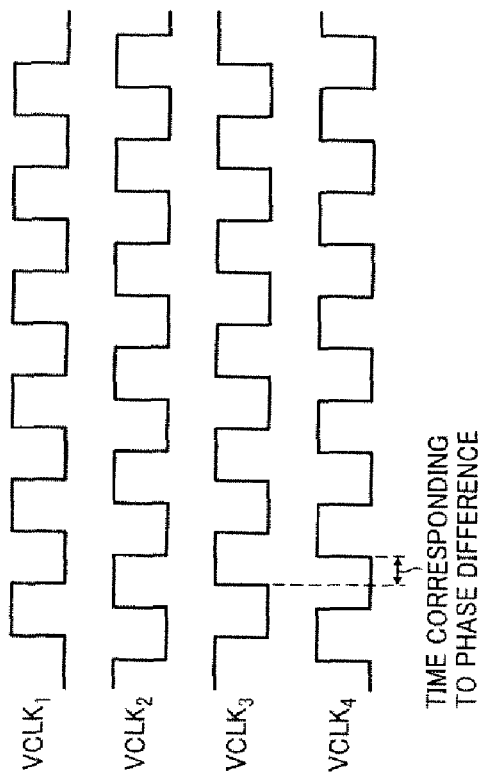
FIG. 28 is a schematic diagram for explaining four high-frequency clock signals with differing phases.
Figure 29:
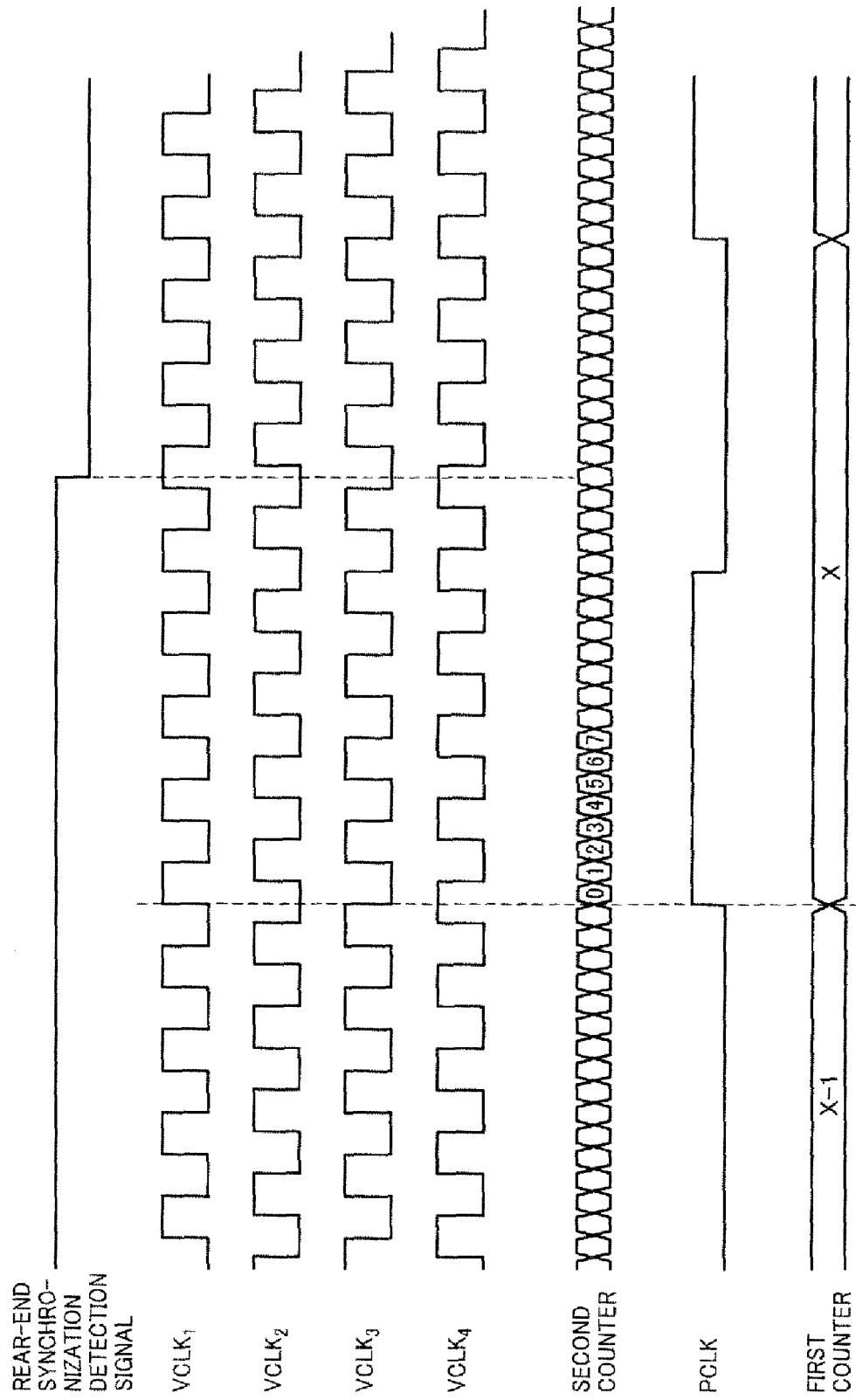
FIG. 29 is a timing chart for explaining an operation of an inter-point counting circuit corresponding to FIG. 28.

As an example, FIG. 28 shows a case in which the high-frequency clock generating circuit 213 generates four high-frequency clock signals $VCLK_1$, $VCLK_2$, $VCLK_3$, and $VCLK_4$ of which phases are different from each other. In this case, the time corresponding to the phase difference of the high-frequency clock signals is ¼ cycle of the high-frequency clock signal. As shown in FIG. 29, the second counter of the point-to-point counting circuit 219*d* is counted up every ¼ cycle of the high-frequency clock signal. Therefore, the correction data Dmod is obtained by Equation (2).

$$Dmod = (X1 \times 32 + Y1) - (X2 \times 32 + Y2) \qquad (2)$$

For example, when the correction data Dmod obtained by Equation (2) is expressed in binary of 12 bits (bit 11 to bit 0), low 5 bits (bit 4 to bit 0) are values in units of ¼ high-frequency clock and high 7 bits (bit 11 to bit 5) are values in units of one pixel clock.

In this case, the high 7 bits of the correction data Dmod are input to the delay circuit a2-1, and the first data converting circuit a2-3 and the second data converting circuit a2-4 convert one pixel data into 32-bit data (see FIG. 30). The modulation-data selecting circuit a2-5 selects 32 bits from the modulation data A and the modulation data B in accordance with the low 5 bits of the input correction data, and outputs it as parallel modulation data (see FIG. 31).

Figure 32:
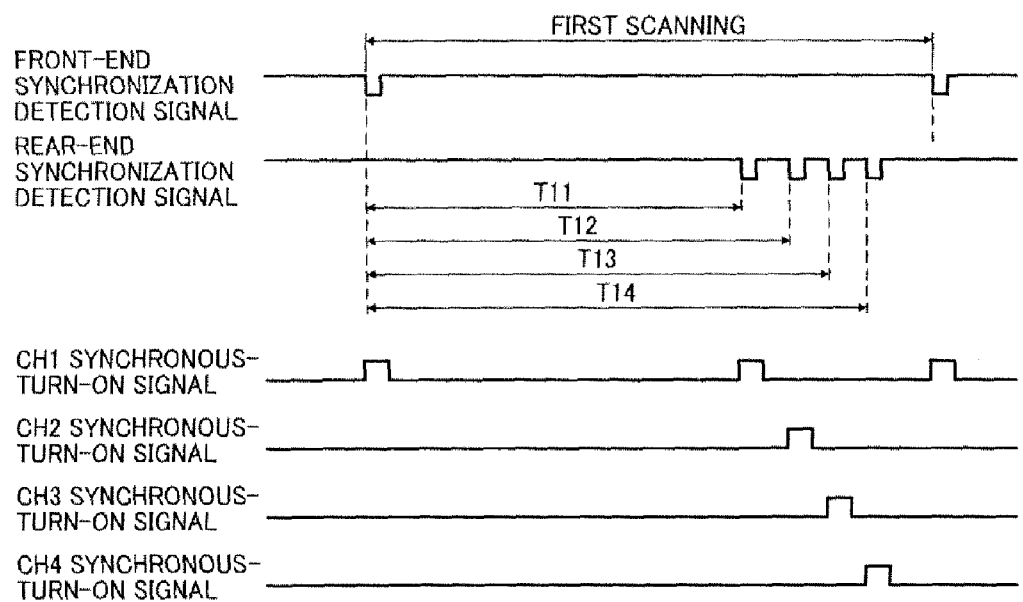
FIG. 32 is a timing chart for explaining a modified example of the operation of the synchronous-turn-on control circuit.

In the present embodiment, one piece of count data is obtained in one scanning; however, it is not limited thereto. For example, as shown in FIG. 32, three pieces of count data can be obtained in one scanning.

Furthermore, in the present embodiment, a writing position by the light emitting unit ch1 is used as a reference; however, the present invention is not limited thereto.

Moreover, in the present embodiment, if the writing positions do not differ greatly among the light emitting units (for example, the light emitting units ch1, ch5, ch9, and ch13) in the same row, front-end information capable of specifying a row can be used instead of the front-end-ch information Dfch. Similarly, rear-end information capable of specifying a row can be used instead of the rear-end-ch information Dech. In this case, correction data is generated for each row.

Furthermore, in the present embodiment, the first-row to the fourth-row light emitting units are aligned at equal intervals in the M direction; however, it is not limited thereto.

Moreover, in the present embodiment, the two-dimensional array 100 includes 16 light emitting units; however, it is not limited thereto.

Furthermore, in the present embodiment, the laser printer 1000 is employed as the image forming apparatus; however, it is not limited thereto. In other words, as long as the image forming apparatus includes the optical scanning device 1010, a high quality image can be formed at high speed.

For example, the image forming apparatus can be configured to directly irradiate a medium such as a paper sheet, which is developed with a laser beam, with a laser beam.

Moreover, the image forming apparatus can be configured to use a silver halide film as an image carrier. In this case, a latent image is formed on a silver halide film by optical scanning, which can be developed by a process equivalent to a developing process in a typical silver halide photographic process. The developed latent image can be transferred onto a printing paper by a process equivalent to a printing process in the typical silver halide photographic process. Such image forming apparatus can be applied to an optical plate making apparatus or an optical drawing apparatus that draws a computed tomography (CT) scan image.

Figure 33:
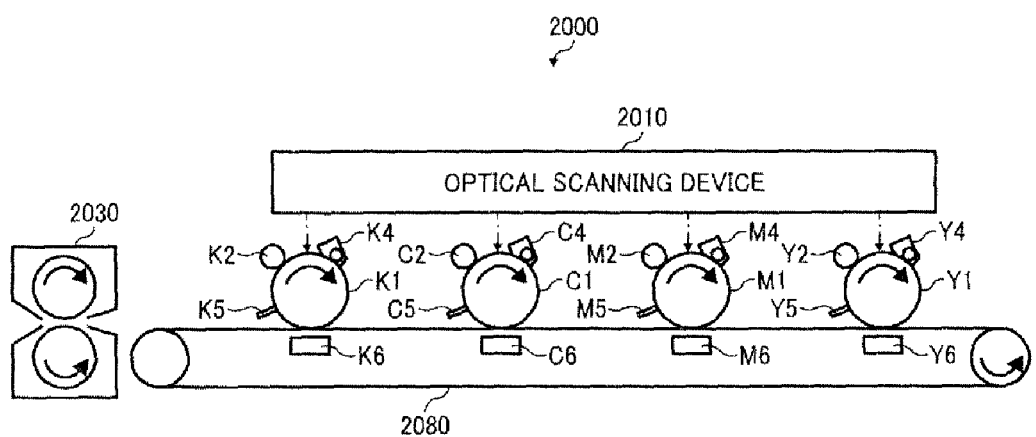
FIG. 33 is a schematic diagram illustrating a configuration of a typical color printer.

Furthermore, as shown in FIG. 33 as an example, the image forming apparatus can be a color printer 2000 including a plurality of photosensitive drums.

The color printer 2000 is a tandem-type multi-color printer that forms a full color image by superimposing four color (black (K), cyan (C), magenta (M), and yellow (Y)) images. The color printer 2000 includes photosensitive drums K1, C1, M1, and Y1, charging units K2, C2, M2, and Y2, developing units K4, C4, M4, and Y4, cleaning units K5, C5, M5, Y5, and transferring units K6, C6, M6, and Y6, for the four colors. The color printer 2000 further includes an optical scanning device 2010, a transferring belt 2080, and a fixing unit 2030.

Each photosensitive drum rotates in a direction indicated by an arrow in FIG. 33. The charging unit, the developing unit, the transferring unit, and the cleaning unit are arranged around each photosensitive drum in this order in a direction in which the photosensitive drum rotates. Each charging unit uniformly charges the surface of a corresponding photosensitive drum. The optical scanning device 2010 irradiates the surface of each photosensitive drum charged by the corresponding charging unit with a light beam, so that a latent image is formed on each photosensitive drum. Then, each latent image is developed into a toner image by a corresponding developing unit. Each toner image is transferred onto a recording sheet by a corresponding transferring unit. Finally, the toner images transferred onto the recording sheet is fixed thereto by the fixing unit 2030.

The optical scanning device 2010 includes a light source similar to the light source 14 and a scan control device similar to the scan control device 22 for each color. Therefore, the optical scanning device 2010 can have an effect similar to the optical scanning device 1010. Thus, the color printer 2000 can have an effect similar to the laser printer 1000.

The color printer 2000 can include the optical scanning devices 1010 for respective colors instead of the optical scanning device 2010.

According to the present embodiment, the light-source driving device is suitable for controlling timing of emitting light from a plurality of light emitting units with high accuracy in real time. Moreover, the optical scanning device is suitable for performing high-density optical scanning with high accuracy. Furthermore, the image forming apparatus is suitable for forming a high quality image at high speed. Moreover, the counting method is suitable for counting deviation of timing of starting writing on a plurality of scanning lines with high accuracy in real time.

According to an aspect of the present invention, timing of turning on a plurality of light emitting units can be controlled in real time with higher accuracy than in a conventional technique.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light-source driving device for use in an optical scanning device to drive a light source, the light source including a plurality of light emitting units arranged in different positions with each other at least in a scanning-line direction, each of the light emitting units configured to emit a light beam, the light beams emitted from the light emitting unit being directed by an optical system to a scan target surface to scan the scan target surface in a main-scanning direction along a plurality of scanning lines to write image information on the scan target surface, the light-source driving device comprising:
   a high-frequency clock generating circuit configured to generate a plurality of high-frequency clock signals with differing phases;
   a write-data generating circuit that generates a plurality of pieces of write data corresponding to the light emitting units in accordance with the image information;
   a modulation-data control circuit that generates a plurality of pieces of modulation data corresponding to the light emitting units based on the write data and adjusts output timing of the modulation data individually in units of time corresponding to a phase difference of the high-frequency clock signals; and
   a driving circuit that drives the light emitting units based on the modulation data output the modulation-data control circuit,
   wherein the modulation-data control circuit includes
      a correction-data obtaining circuit that obtains a deviation of writing start timings on the scanning lines individually as correction data that includes data in units of time corresponding to the phase difference of the high-frequency clock signals, and
      an adjusting circuit that adjusts the output timing of the modulation data individually in units of the phase difference of the high-frequency clock signals so that the writing start timings on the scanning lines agree with each other, based on the correction data obtained in the correction-data obtaining circuit, and
   wherein a pixel clock signal that is generated based on one of the high-frequency clock signals generated in the high-frequency clock generating circuit is input to the modulation-data control circuit, and
   the modulation-data control circuit divides the deviation into a first deviation that is a multiple of a cycle of the pixel clock signal and a second deviation that is less than the cycle of the pixel clock signal, obtains first correction data in units of the cycle of the pixel clock signal based on the first deviation, and obtains second correction data in units of the time corresponding to the phase difference of the high-frequency clock signals based on the second deviation.

2. The light-source driving device according to claim 1, wherein the adjusting circuit includes
   a first delay circuit that delays the modulation data by time corresponding to the first correction data in units of the cycle of the pixel clock signal and outputs delayed modulation data as a first output signal;
   a second delay circuit that delays the first output signal by the cycle of the pixel clock signal and outputs second output signal; and
   a data selecting circuit that selects a plurality of pieces of data from parallel data obtained from the first output signal and parallel data obtained from the second output signal in accordance with the second correction data.

3. The light-source driving device according to claim 2, wherein the first delay circuit includes a shift register including a plurality of stages, and
   number of the stages is determined depending on a relationship among the light emitting units.

4. A light-source driving device for use in an optical scanning device to drive a light source, the light source including a plurality of light emitting units arranged in different positions with each other at least in a scanning-line direction, each of the light emitting units configured to emit a light beam, the light beams emitted from the light emitting unit being directed by an optical system to a scan target surface to scan the scan target surface in a main-scanning direction along a plurality of scanning lines to write image information on the scan target surface, the light-source driving device comprising:
   a high-frequency clock generating circuit configured to generate a plurality of high-frequency clock signals with differing phases;
   a write-data generating circuit that generates a plurality of pieces of write data corresponding to the light emitting units in accordance with the image information;
   a modulation-data control circuit that generates a plurality of pieces of modulation data corresponding to the light emitting units based on the write data and adjusts output timing of the modulation data individually in units of time corresponding to a phase difference of the high-frequency clock signals; and
   a driving circuit that drives the light emitting units based on the modulation data output from the modulation-data control circuit,
   wherein the modulation-data control circuit includes
      a correction-data obtaining circuit that obtains a deviation of writing start timings on the scanning lines individually as correction data that includes data in units of time corresponding to the phase difference of the high-frequency clock signals, and
      an adjusting circuit that adjusts the output timing of the modulation data individually in units of the phase difference of the high-frequency clock signals so that the writing start timings on the scanning lines agree with each other, based on the correction data obtained in the correction-data obtaining circuit, and
   wherein the optical scanning device includes
      a first light receiving element that receives light before starting writing via the optical system, and a second light receiving element that receives light after the writing via the optical system, wherein a first synchronization signal output from the first light receiving element and a second synchronization signal output from the second light receiving element are input to the modulation-data control circuit wherein the correction-data obtaining circuit obtains the deviation based on the first synchronization signal, the second synchronization signal, the high-frequency clock signals, and the pixel clock signal, and wherein the correction-data obtaining circuit obtains the deviation of a second light emitting unit with respect to a first light emitting unit from among the light emitting units, based on a difference between a first time and a second time, the first time being from a time the first light receiving element receives light emitted from the first light emitting unit to a time the second light receiving element receives the light, and the second time being from a time the first light receiving element receives light emitted from the first light emitting unit to a time the second light receiving element receives light emitted from the second light emitting unit.

5. The light-source driving device according to claim 4, wherein the correction-data obtaining circuit obtains the deviation of one of the light emitting units in one scanning.

6. The light-source driving device according to claim 4, wherein the correction-data obtaining circuit obtains the deviation of more than one of the light emitting units in one scanning.

7. An optical scanning device that scans a scan target surface in a main-scanning direction along a plurality of scanning lines with a plurality of light beams, the optical scanning device comprising:
a light source that includes a plurality of light emitting units arranged in different positions with each other at least in a scanning-line direction;
the light-source driving device according to claim 1 to drive the light source; and
an optical system that focuses the light beams from the light source on the scan target surface as a plurality of light spots and provides a control to move the light spots in the main-scanning direction along the scanning lines.

8. The optical scanning device according to claim 7, wherein the light source includes a surface emitting laser array.

9. A counting method for counting a deviation of a timing of starting writing on a plurality of scanning lines in an optical scanning device that scans a scan target surface along the scanning lines with a plurality of light beams from a plurality of light emitting units arranged in different positions at least in a scanning-line direction to write image information on the scan target surface, the counting method comprising:
obtaining a time difference between a first time at which a first light receiving element outputs a synchronization detection signal before starting writing receives light emitted from a first light emitting unit and a second time at which a second light receiving element outputs a synchronization detection signal after the writing receives the light, from among the light emitting units, as a first time;
obtaining a time difference between a third time at which the first light receiving element receives light emitted from the first light emitting unit and a fourth time at which the second light receiving element receives light emitted from the second tight emitting unit, as a second time; and obtaining a deviation of the second light emitting unit with respect to the first light emitting unit based on a difference between the first time and the second time.

10. An optical scanning device that scans a scan target surface in a main-scanning direction along a plurality of scanning lines with a plurality of light beams, the optical scanning device comprising:
a light source that includes a plurality of light emitting units arranged in different positions with each other at least in a scanning-line direction;
an optical system that focuses the light beams from the light source on the scan target surface as a plurality of light spots and provides a control to move the light spots in the main-scanning direction along the scanning lines;
a first light receiving unit that receives light before starting writing;
a second light receiving element that receives light after the writing; and
a control unit that obtains the deviation of a second light emitting unit with respect to a first light emitting unit from among the light emitting units, based on a difference between a first time and a second time, the first time being a time difference between a first time at which the first light receiving element receives light emitted from the first light emitting unit and a second time at which the second light receiving element receives the light, and the second time being a time difference between a third time at which the first light receiving element receives light emitted from the first light emitting unit and a fourth time at which the second light receiving element receives light emitted from the second light emitting unit.

11. The optical scanning device according to claim 10, wherein the control unit includes a high-frequency clock generating circuit that generates a plurality of high-frequency clock signals with differing phases, and
the control unit obtains the deviation in units of time corresponding to the phase difference of the high-frequency clock signals.

12. The optical scanning device according to claim 10, wherein the control unit includes
a high-frequency clock generating circuit configured to generate a plurality of high-frequency clock signals with differing phases, and
a pixel-clock generating circuit that generates a pixel clock signal based on one of the high-frequency clock signals generated in the high-frequency clock generating circuit, and
the control unit divides the deviation into a first deviation that is a multiple of a cycle of the pixel clock signal and a second deviation that is less than the cycle of the pixel clock signal, obtains the first deviation data in units of the cycle of the pixel clock signal, and obtains the second deviation data in units of the time corresponding to the phase difference of the high-frequency clock signals.

13. The optical scanning device according to claim 10, wherein the control unit obtains the deviation of one of the light emitting units in one scanning.

14. The optical scanning device according to claim 10, wherein the control unit obtains the deviation of more than one of the light emitting units in one scanning.

15. The optical scanning device according to claim 10, wherein the light source includes a surface emitting laser array.

* * * * *